United States Patent [19]
Dundorf

[11] Patent Number: 5,197,013
[45] Date of Patent: Mar. 23, 1993

[54] METHOD OF FORMING A CARVED SIGN USING AN AXIALLY ROTATING CARVING TOOL

[75] Inventor: David M. Dundorf, 389 Shelbourne Ter., Ridgewood, N.J. 07450

[73] Assignee: David M. Dundorf, Ridgewood, N.J.

[21] Appl. No.: 639,258

[22] Filed: Jan. 9, 1991

Related U.S. Application Data

[62] Division of Ser. No. 78,832, Jul. 28, 1987, abandoned.

[51] Int. Cl.$^5$ ............................................. G05B 19/02
[52] U.S. Cl. .......................... 364/474.24; 364/474.05; 219/121.69
[58] Field of Search ...................... 364/474.05, 474.24, 364/474.03, 474.04, 474.06, 474.08, 474.26, 474.29, 474.16; 219/121.68, 121.69

[56] References Cited

U.S. PATENT DOCUMENTS

| | | | |
|---|---|---|---|
| 4,589,062 | 5/1986 | Kishi et al. | 364/474.29 |
| 4,757,461 | 7/1988 | Stohr et al. | 364/512 |
| 4,893,251 | 1/1990 | Seki et al. | 364/474.29 |
| 4,905,158 | 2/1990 | Seki et al. | 364/474.29 |
| 4,907,164 | 3/1990 | Guyder | 364/474.24 |
| 4,945,487 | 7/1990 | Kimura et al. | 364/474.05 |

Primary Examiner—Jerry Smith
Assistant Examiner—Patrick D. Muir
Attorney, Agent, or Firm—Hoffman & Baron

[57] ABSTRACT

A computer-produced carved sign having three-dimensional surfaces, is produced by a method which comprises designing on a computer-aided design system, a three-dimensional graphical model of the signage work having three-dimensional surfaces to be carved in a signboard. On the computer-aided design system, a desired mathematical representation of the three-dimensional graphical model of the signage work to be carved in the signboard, is determined, and the desired mathematical representation is provided to a computer-aided machining system having a carving tool. Material constituting the signboard is removed using the carving tool moving under the controlled guidance of the computer-aided machining system. The CAD system allows the user to input an alpha-numeric character. The CAD system automatically creates the machining path by developing similar outlines of the alpha-numeric character and projects these outlines into the 3D graphical model. In another embodiment of the invention, the CAD system displays a model of the machine tool removing material from the workpiece to allow the user to change the CAD program before actual machining.

8 Claims, 15 Drawing Sheets

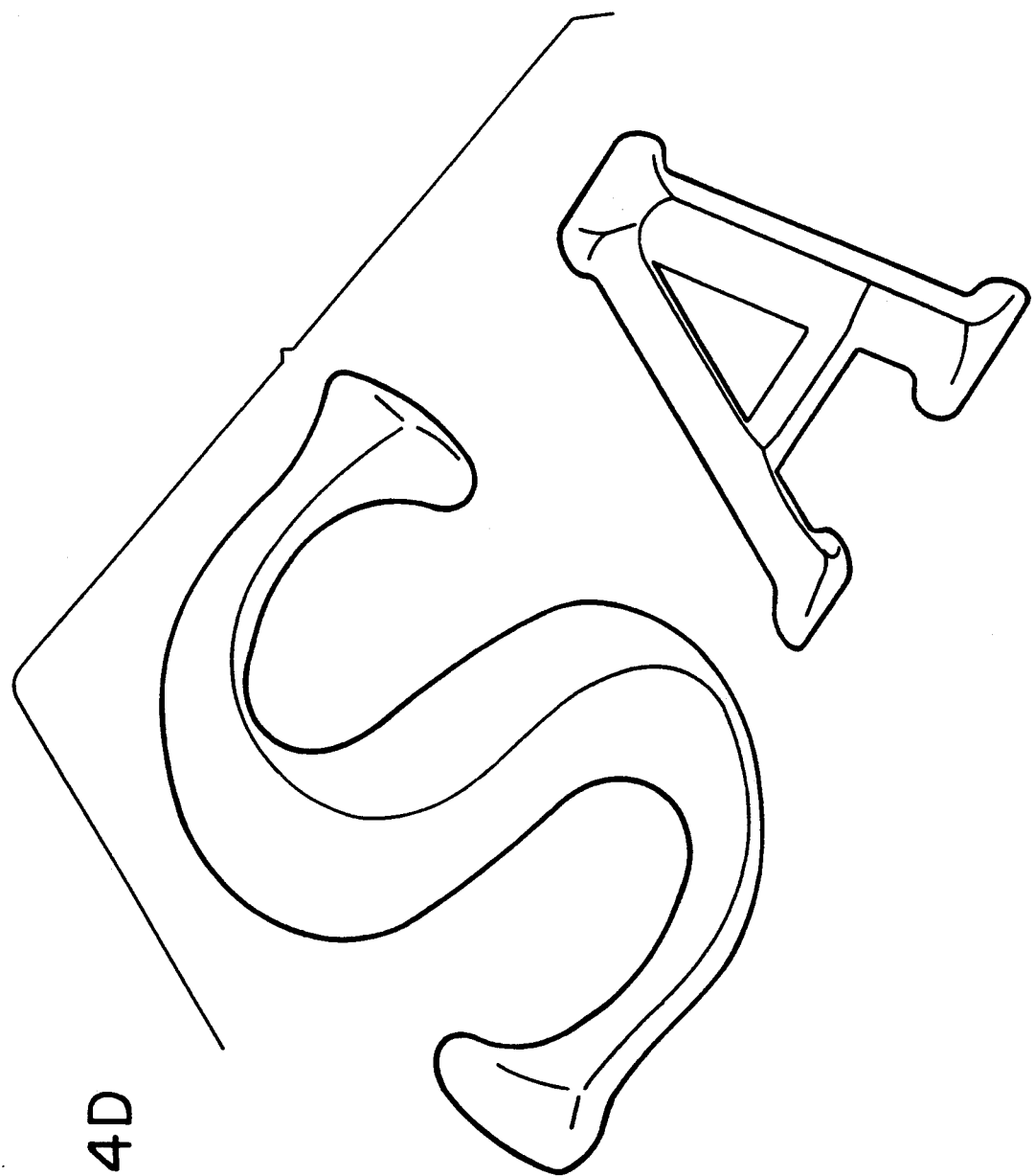
FIG. 4D
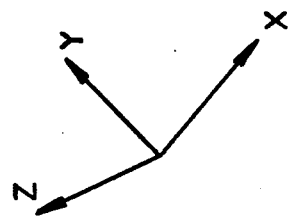

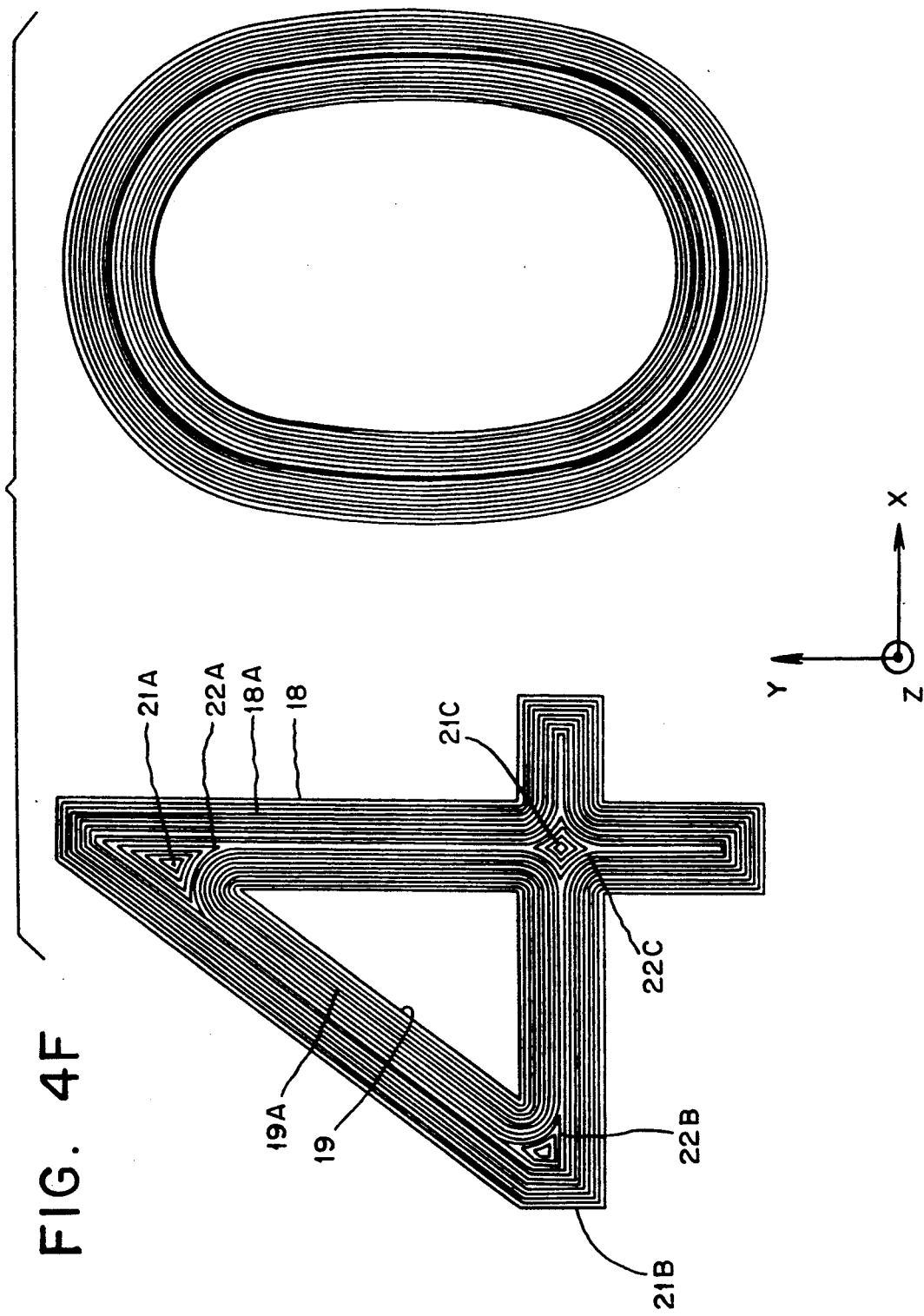

METHOD OF FORMING A CARVED SIGN USING AN AXIALLY ROTATING CARVING TOOL

This is a divisional of copending application Ser. No. 07/078,832 filed on Jul. 28, 1987, and now abandoned.

FIELD OF THE INVENTION

The present invention relates generally to methods and apparatus for producing carved signs, and more particularly to methods and apparatus for producing carved signs using computers.

BACKGROUND OF THE INVENTION

Carving, dating long before paper was invented, can be considered one of the earliest forms of writing. Letters carved in wood provide a sense of warmth and a feeling of permanence, and can focus the attention of viewers in a most dramatic way.

Dating well beyond the Colonial Period, traditional hand-carved wood signs having gold-leafed lettering had found a deep rooted place in our culture, and over the years the manufacture of such signs has become a time-honored craft of the signmaking arts. Wood chisels and special knives are the wood crafters basic carving tools used in the time consuming process of hand carving signage works in both relieved and incised modes of carving. Traditionally gold or silver leaf coatings have been applied to the relieved and/or incised surfaces of signage works, so that natural as well as artificial light favorably reflects therefrom to improve the visibility of the signage work, and to display a sense of richness and accentuate the artistic beauty of a signage work itself.

The conventional process for producing these hand-carved gold-leafed wood signs is manual, slow and laborious, and although expensive, they are of distinct beauty and treasured by many.

Yet while hand carved wood signs with gold-leaf lettering are highly desired articles of manufacture, the traditional process by which they have been made, has tended to make them time intensive, too expensive and thus out of reach for the greater number of persons who otherwise would desire to own such a sign customized to their needs, interests and taste.

Hitherto, the art of making gold-leafed hand-carved wood signs has retained its traditional method of manufacture, with the exception of a minor development involving the use of an overhead projector to transfer a layout pattern to prepared wood. Such a layout transfer technique is described in Volume 15 of Fine Woodworking, March 1979, in an article at pages 72-73 entitled "Routed Signs: Overhead Projector Transfers Layout To Prepared Wood" by Frederick Wilbur. Using architectural stick-on letters, a few parallel lines and a design concept, a sign layout is mocked-up on a piece of transparent plastic film. Using an overhead projector, the layout is transferred onto the prepared wood.

In contrast with wood carving signmakers universally eschewing, as a matter of convention, any and all computer-assistance in practicing conventional methods of manufacturing gold-leafed carved wooden signs, the signmaking industry in general, has nevertheless been effected by the application of computer-aided design, computer-aided manufacturing and computerized numerical control technology.

Hitherto, several computer-aided signmaking systems employing computer-aided design (CAD) and computer-aided manufacturing and computer numerical control (CNC) based technology, have been developed and are presently available.

However, such signmaking systems and methods using CAD/CAM technology have been limited to the production of routed and cut-out type signs. In contrast, because of its nature, the art of carving traditional gold-leafed wood carved signs has remained in the field of art wherein wood carvers use only gouges, knives, chisels and hammers. Thus, it is now in order to briefly describe in the following paragraphs, these inherently limited CAD/CAM signmaking systems and methods.

Prior art computer-aided signmaking systems allow a signmaker to design two dimensional signage works on two-dimensional CAD systems, and to cut-out or route-in characters, shapes, designs and parts thereof so designed, using cutting tools moving under the guidance of a computer-aided machining system, which includes, a computerized numerically controlled (CNC) axially rotating routing tool. However, the cutting and routing functions achieved by the prior art CAD/CAM signmaking systems are limited in several significant ways.

In general, signage works formed into signboards by prior art CAD/CAM signmaking systems, are routed thereinto by operation of a routing tool moving in a single plane, with single pass operations. The outlines of the characters are formed by a rotating router tool bit moving in a plane, routing out uniform grooves in the signboard within the plane. Notably, the uniform grooves formed in the signboard, have the cross-sectional shape of the rotating tool bit performing the routing operation, and are identical along the entire lengths of the members of alphanumeric characters. In some cases, multiple passes of the routing tool along the character outlines is effected, often using tool bit offsetting, to provide desired finished edges, slightly modifying the original uniform groove so formed coextensively within a single plane. These routed signs bear little if any resemblance to, and lack the surface features of, traditional gold-leafed wood carved signs, the subject to which the present invention is directed.

One example of such prior art signmaking apparatus is described in the sales brochure for the "System 48 Plus" of Gerber Scientific Products, Inc. of Manchester, Conn., wherein a computer-aided signmaking system is disclosed. Specifically, the "System 48 Plus" signmaking system comprises a computer-aided manufacturing system which includes a gantry-type cutting machine which can cut or route-out letters up to 24" high, or stencil-cut sign faces for backlighting. The characters so formed from the system, are square cut or beveled, with an optional finish cut. Also, the system provides control for specifying the total depth of cut, and depth of each pass of the router head. (See pages 4.74-4.76, IV System Operation of Gerber Scientific Products' System 48 User's Manual, Document No. 599-020174, January 1986). However, while the "System 48 Plus" signmaking system allows an operator to make any number of passes from 0" to 2" inches deep for efficient routing and finer surface finishes, the system is incapable of carving into a signboard, a signage work comprising characters and designs having three-dimensional incised and/or relieved surfaces for which hand-crafted gold-leafed wood carved signs are noted. In particular, the Gerber "System 48 Plus" is limited to 2½ axes of simultaneous cutting tool motion.

Another example of prior art signmaking apparatus is described in the sales brochure for the "CSF 300 Computerized Sign Fabrication System" of Cybermation Inc. of Cambridge, Mass. The brochure discloses a CAD/CAM signmaking system including a router head mounted to the carriage of a CNC gantry-type machine which is limited to 2½ axes of simultaneous motion. Sign layouts, either computer-designed or conventionally laid out, are programmed and can be called up at the machine by an operator. While the system has a library of pre-programmed geometric parts (i.e., letters and numbers in various typestyles) requiring the operator to enter only the desired dimensions, such parts do not have the three-dimensional features characteristic of traditional gold-leafed hand-carved wood signs, nor is the CSF 300 system capable of carving signs having such surface characteristics and features.

Thus, in the art of computer-assisted design and manufacture of signage works, the convention has been to use CAD systems to design two-dimensional layouts of signage works to be cut-out of or simply routed-in various signboard materials. In the latter instance, the routed surfaces formed within a single plane of a signboard, are limited to the cutting dimensions of the tool bit employed and moving in the plane thereof.

Therefore, there is no teaching or suggestion of a computer-aided method or system for producing carved signs embodying signage works which have three-dimensional surfaces akin to those characteristic of traditional hand-crafted gold-leafed wood carved signs.

Accordingly, it is a primary object of the present invention to provide a way of doing by computers and machines, that which was done by hand in order to produce carved signs having three-dimensional surfaces akin to those characteristic of hand carved gold-leafed wood carved signs.

Another object of the present invention is to provide a computer-aided method of producing carved signs which embody signage works having three-dimensional incised and/or relieved surfaces, characteristic of traditional gold-leafed hand-carved wood signs.

It is a further object of the present invention to provide a method of producing carved signs resembling traditional hand-carved gold-leafed wood signs, wherein the method uses an integration of computer-aided design (CAD), computer-aided machining (CAM), and computerized numerical control (CNC) technology.

The present invention provides a design and manufacturing method for providing computer-produced carved signs embodying signage works having complex three-dimensional surfaces.

A principal advantage of the method hereof is it allows production of a prototype carved sign within only a few minutes after the design has been completed. As for small volume or customized production, the method requires at most, only a few hours of design time and a few minutes of manufacturing time per carved sign.

Another object of the present invention is to provide a carved sign embodying a signage work formed in a signboard by an axially rotating carving tool simultaneously moving along at least three programmable axes under the controlled guidance of a computer-aided machining system.

A further object of the present invention is to provide a computer-aided method of producing carved signs embodying signage works comprising characters shapes and designs having three-dimensional incised and/or relieved complex surfaces. According to the present method, the characters are designed on a computer-aided design system by creating a three-dimensional geometric model thereof, and are carved into a signboard using a carving tool moving under the guidance of a computer-aided machining system.

Another object of the present invention is to provide a carved sign produced by such computer-aided method of design and manufacture.

It is an even further object of the present invention to provide a CAD/CAM system for producing carved signs embodying signage works having three-dimensional incised and/or relieved curved surfaces. An advantage of the design and manufacturing method of the present invention is that a signage work represented by a three-dimensional graphical and numeric model can be exactly reproduced, as a carving in signboards, thereby allowing the use of such three-dimensional signage works as trademarks and service marks, registered with the United States Patent and Trademark Office.

A further object of the present invention is to provide a method of generating on a computer-aided design system, three-dimensional computer graphic (or, geometric) models (and numerical coordinate data files for corresponding three-dimensional carving tool paths) of three-dimensional characters generated from traditional two-dimensional characters. Such computer-aided design method can be used with the method and system for producing carved signs hereof.

Another object of the present invention is to provide a method of designing three-dimensional graphical models (i.e., representations) and numerical coordinate data files of three-dimensional characters generated from two-dimensional characters, using parametric spline-curve and/or spline-surface representations in interpolating curves and surfaces, respectively.

Another object of the present invention is to provide a method of manufacturing, carved signs embodying signage work having been recorded from preexisting physical objects using three-dimensional surface coordinate measuring methods and apparatus (e.g., instrumentation), based on principles including laser-ranging, and holography.

An even further object of the present invention is to provide a method of generating three-dimensional graphical representations and corresponding numerical coordinate data files of a signage work wherein such method employs a computer-aided three-dimensional solid image processing program on the CAD system hereof. This method provides a designer with the capability of precisely mathematically subtracting (e.g., using a computational process on the CAD system), three-dimensional solid stock material from a three-dimensional solid model of a signboard which is in mathematical union with the solid model of a carving tool that is translatable within the CAD systems' three-dimensional coordinate system, using a three-dimensional or two-dimensional stylus or a mouse. In particular, this method involves providing a solid geometric model (i.e., three-dimensional solid graphical representation) of a carving tool and of signboard constituting material, and performing therewith, three-dimensional solid-image processing. A principal advantage of this CAD method is that it provides a highly flexible way in which to render a desired three-dimensional model (e.g., graphical representation) from which can be generated, numerical coordinate data file(s) for a three-dimensional composite tool path corresponding to a signage work to be carved in a real signboard using a particular carving tool or tools of the present invention.

Yet a further object of the present invention is to provide a computer-aided carved sign design and manufacturing system on which the methods hereof can be computer-programmed, and wherein the design and manufacturing system comprises in part, a computer-aided design system that can automatically generate and display a computer-simulation of the carving tool motion required to produce the desired signage work carved in a signboard. The design and manufacturing system of the present invention also includes a computer-aided carving system having at least a three-dimensional numerical control (NC) machining (i.e., tool path) program, supported by a CAD/CAM computer.

Other and further objects will be explained hereinafter, and will be more particularly delineated in the appended claims, and other objects of the present invention will in part be obvious to one with ordinary skill in the art to which the present invention pertains, and will, in part, appear obvious hereinafter.

SUMMARY OF THE INVENTION

The present invention uses an integration of computer-aided design, computer-aided manufacturing, and computer numerical control technology to provide a computer-aided design and manufacturing process for producing carved signs having surface properties and features characteristic of traditional hand-crafted gold-leafed wood carved signs.

In accordance with the principles of the present invention, the method for producing carved signs hereof comprises designing on a computer-aided design (CAD) system, a three-dimensional graphical model (i.e., representation) of a signage work having three-dimensional surfaces to be carved in a signboard. On the computer-aided design system, a desired mathematical (e.g., numerical) representation of the signage work is determined. Thereafter, the desired mathematical representation, which can be in one of many possible and desirable formats, is provided to a computer-aided machining (CAM) system including a CNC machine tool having a carving tool. The material constituting the signboard is removed using the carving tool moving under the controlled guidance of the computer-aided machining system, to leave in the signboard, a three-dimensional carved pattern corresponding to the three-dimensional graphical model of the signage work. The three-dimensional carved pattern in the signboard has three-dimensional surfaces corresponding to the three dimensional surfaces of the three-dimensional graphical model of the signage work.

DESCRIPTION OF THE DRAWINGS

For a further understanding of the objects of the present invention, reference is made to the following detailed description of the preferred embodiment which is to be taken in connection with the accompanying drawings, wherein:

FIGS. 4D and 4E are different scaled perspective views of three-dimensional composite carving tool paths, shown in association with respective characteristic outlines of the three-dimensional graphical models of the alphabetical characters "SA" illustrated in FIGS. 4B and 4C;

FIG. 4F is a plan view of a three-dimensional graphical model of the numerical character of the numerical character "40" of the signage work of FIGS. 3A and 4A hereof;

DETAILED DESCRIPTION OF THE PREFERRED EMBODIMENT

It is now in order to describe in a best mode embodiment, the details of the design and manufacturing method and apparatus for producing carved signs embodying signage works having three-dimensional incised and/or relieved carved surfaces, in accordance with the principles of the present invention.

Figure 1:
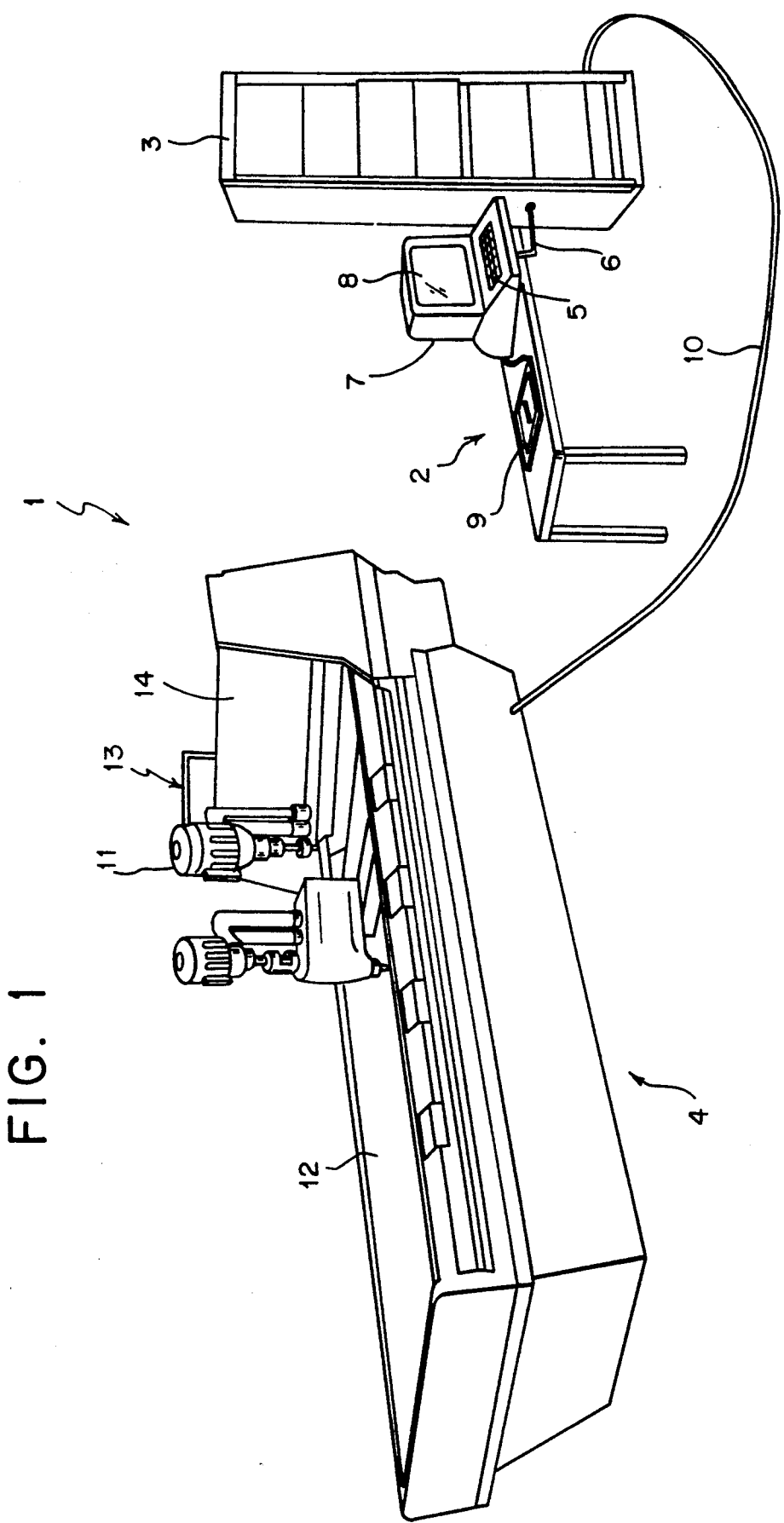
FIG. 1 is a perspective view of an example of the design and manufacturing equipment required to provide a carved sign manufactured in accordance with the preferred embodiment of the design and manufacturing method of the present invention.

Referring now to FIG. 1, therein is shown an example of a computer-produced carved sign (CPCS) design and manufacturing system 1, although many different system configurations are possible and would be evident hereinafter to those skilled in the art. From this description, for purposes of illustration, the CPCS system 1 includes a computer-aided design/computer-aided machining (CAD/CAM) work station 2, a CAD/CAM computer 3 including software packages, and a CAM system 4.

The CAD/CAM work station 2 includes a keyboard 5 for providing instructions and data to the CAD/CAM computer 3 via a connection 6. For reviewing the design, a three-dimensional high-resolution color graphics display unit 7 having a view screen 8 is part of the CAD/CAM work station 2. In the preferred embodiment, the three-dimensional high resolution color graphics display terminal, can be the Iris 3030 workstation from Silicon Graphics, Inc. of Mountain View, Calif.

Figure 2:
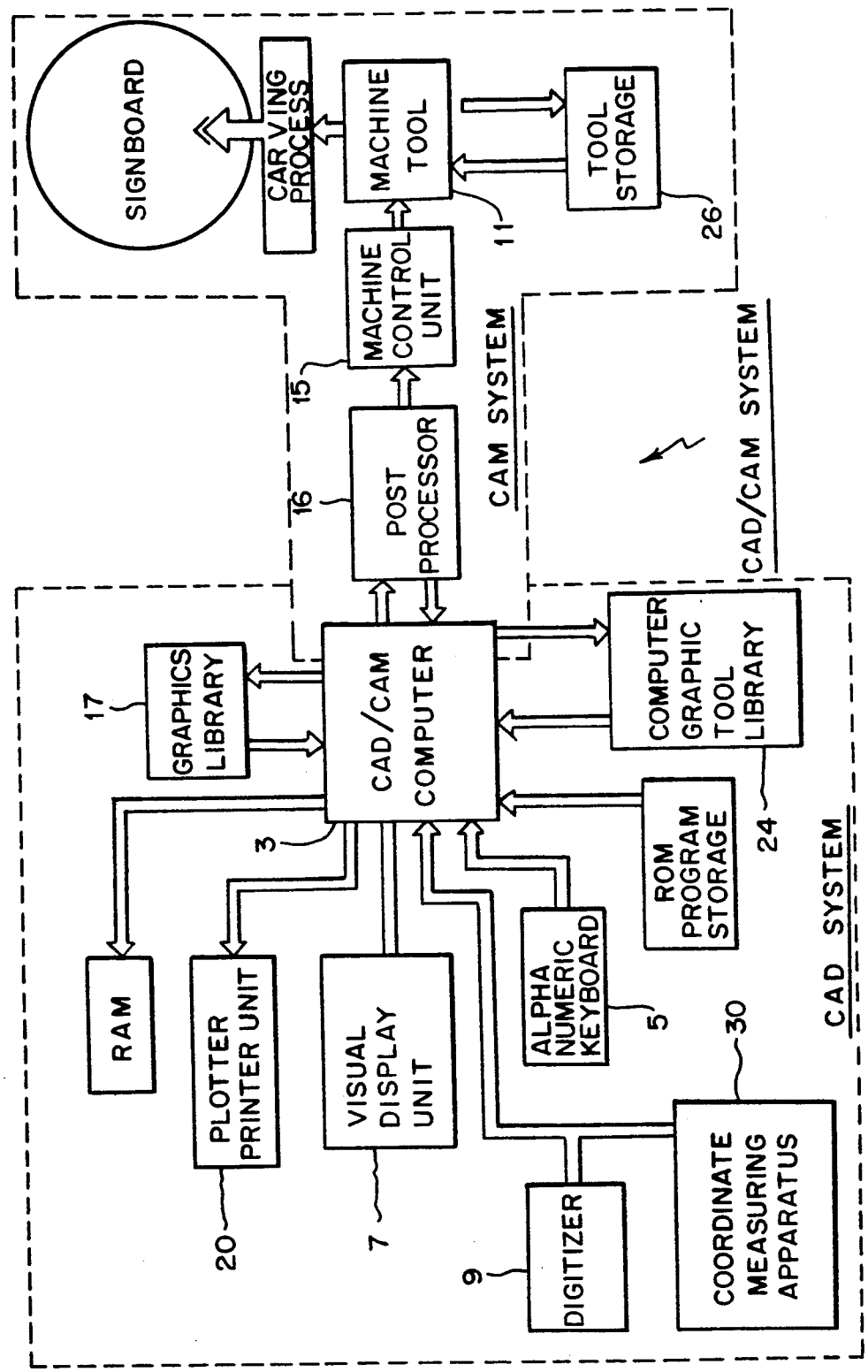
FIG. 2 is a schematic block diagram of the computer-aided design and manufacturing system for producing carved signs hereof, shown in FIG. 1.

As illustrated in FIG. 2, the CAD/CAM work station 2 can be designated as having several other computer-assisted design tools, such as three and two-dimensional "object" coordinate measuring apparatus, and methods used in connection therewith. An example of two-dimensional coordinate measuring apparatus would be a digitizer tablet 9, and an example of three-dimensional coordinate measuring apparatus 25 would be the Cyberscan ™ laser-based non-contact height profiling system, available from Cyberoptics, Inc. of Minneapolis, Minn.

As illustrated in FIG. 1, the CAD/CAM computer 3 is shown as a single unit although it may comprise separate systems available from many different manufacturers. The CAD/CAM computer 3 is connected by a connection 10 to the CAM system 4. Information developed on the computer 3 can be optionally transported to the CAM system 4 on standard commercial magnetic media in the appropriate computerized language formats numerically controlled. Alternatively, connection 10 be realized using a modem in accordance with conventional telecommunication principles (e.g., using the telephonic circuits, microwave and/or satellite links). As will be discussed in greater detail hereinafter, the CAD/CAM computer 3 can be used for either manual, semi-manual, or automatic generation of carving tool paths, based on the geometry of a part developed in the CAD/CAM computer during the CAD phase.

The CAM system as defined herein, is shown in the preferred embodiment as having a gantry-type carving tool 11 mounted over a vacuum type work table 12 on order of the size of a typical signboard used in outdoor commercial environments, such as in front of a law office or other professional building, but it can be much larger or smaller. The carving tool 11 in the preferred embodiment, comprises an axially rotating carving tool, such as an electric or pneumatic router head, which is mounted to a carriage 13 that moves along the gantry structure 14 in response to three-dimensional "carving tool path" instructions provided thereto. In the preferred embodiment, the carving tool 11 is provided with five programmable axes of simultaneous motion.

In order to properly practice the computer-assisted design and manufacturing method of the present invention, the carving tool 11 need only have at least three programmable axes of simultaneous motion. However, while in the preferred embodiment of the present invention, three-programmable axes of simultaneous carving tool movement can be employed, five or seven programmable axes of simultaneous carving tool movement can provide certain advantages when carving particular types of three-dimensional signage works. Three, five, and seven axes gantry-type machine tools are available from Thermwood Corporation, of Dale, Ind. In particular, the Thermwood Cartesian 5 Aerospace model having five axes of programmable motion, features a computer numerical controller (i.e., machine control unit) from the Allen-Bradley Corporation, having bubble memory and milling software. The table size available with such a model is 7½ feet by almost 16 feet, the vacuum feature making it most suitable for accurately holding down a signboard with repeatability.

The CAM system 2 also includes a computer numerical controller (CNC) referred to hereinafter as the machine control unit (M.C.U.) shown in FIG. 2. The CAM system 2 is in addition to other mechanical material removal systems such as drills, routers, sanders and the like which can find auxiliary application in carved sign manufacturing operations.

Referring now to FIG. 2, there is shown a schematic block representational diagram of the CPCS design and manufacturing system 1 of the present invention. As shown in FIG. 1, the system of FIG. 2 also comprises the CAD/CAM work station 2, the CAD/CAM computer 3, machine control unit 15, gantry-type carving tool with axially rotating carving tool 11 and also "a post processor" 16. It also is shown to include a Graphics Library 17, realized as a computer data base in communication with the CAD/CAM computer 3. In order to provide hardcopy print-outs (i.e., plots) of a three-dimensional graphical or numerical models of signage works, a plotter/printer unit 20 can be provided. Alternatively, screen image reproductions can be provided by photographic equipment.

The Graphics Library 17 contains symbolic representations, such as numerical coordinate tool path data files, three-dimensional geometrical and graphical (e.g., curve, surface, and solid) models, design documentation and the like, of signage parts including characters, shapes and designs previously designed or otherwise provided. The symbolic representations stored in the Graphics Library 17 hereof can be (i) generated on the CAD/CAM system 1 in accordance with the computer-assisted (and automated) design methods of the present invention, and then (ii) stored in the computer data base 17. Alternatively, the symbolic representations in Graphics Library 17 can be produced with the aid of three and two-dimensional coordinate measuring methods and apparatus to be described in detail hereinafter. Thereafter they can be called up by a designer at the work station 2 and concatenated with others, using the keyboard of the workstation to display inventory files on the viewing screen of the 3-D color graphics display unit 7. Alternatively, the symbolic representations of characters, shapes and designs after having been generated in accordance with the methods hereof, can be copied, post-processed, and used on other CAD/CAM systems once the original design work has been achieved Greater details regarding use of the Graphics Library 17 in the step involving designing signage works to be carved in signboards, will be given in a later section of this Description.

Figure 3B:
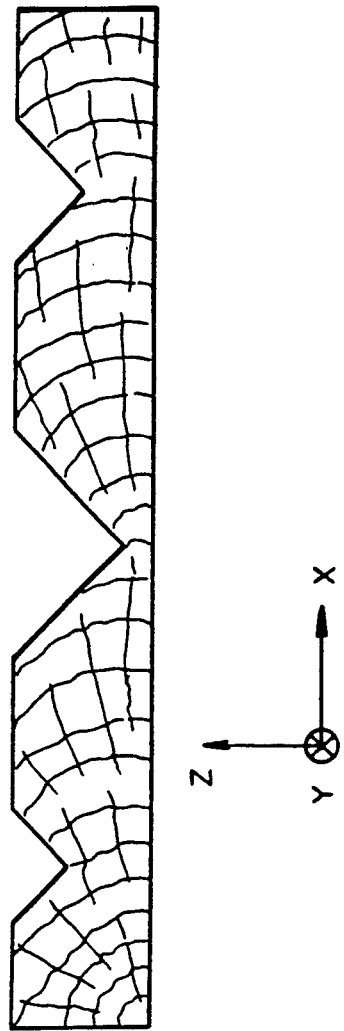
FIG. 3B is an elevated cross-sectional side view of a carved signboard embodying a signage work produced by the method hereof illustrating the three-dimensional nature of the "center line" curves of the carved grooves incised therein.
Figure 3A:
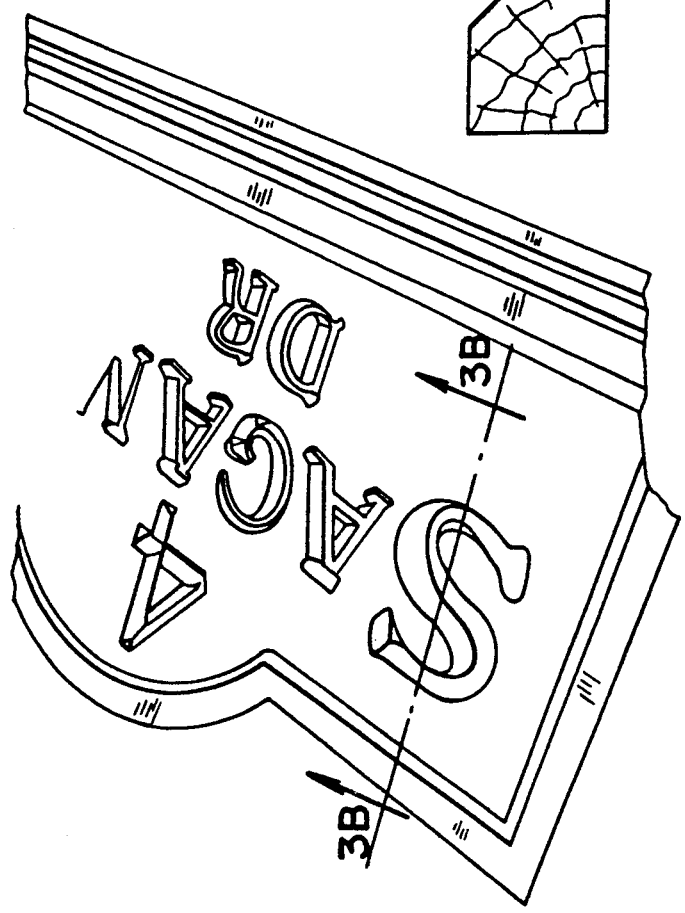
FIG. 3A is a perspective view of a carved sign produced by the method hereof, showing the emulated geometrical features of traditional hand-carved wood signs.

Referring to FIG. 3A, there is shown a perspective view of a signboard embodying a three-dimensional carved pattern produced by the design and manufacturing method and using the apparatus of the present invention. FIG. 3A illustrates how with the computer-assisted carving method of the present invention, the "width" of carved grooves can be made to vary in the x-y plane. In FIG. 3B, a cross-sectional view of the carved sign of FIG. 3A taken along the line 3B—3B, is shown. This cross-sectional view illustrates the potentially complex nature of the surfaces. More particularly, this view illustrates how the depth of carved "V" and other shaped grooves of a signage work can be made to vary along the z axis as a function of x, y coordinates in the x-y plane. Using the design and manufacturing method of the present invention, virtually any type of signage work having simple or complex three-dimensional surfaces, can be represented as a three-dimensional graphical model on the CAD system of the present invention, and carved into a signboard using, the carving tool of the computer-aided machining system thereof, governed by a desired mathematical representation generated from the three-dimensional graphical model.

At this juncture, it is now in order to briefly describe the mathematical basis underlying the geometrical and graphical modeling and graphical display of curves, surfaces, and solids comprising the computer-generated three dimensional graphical models of the present invention in particular, and three-dimensional mathematical representations of signage works and components thereof, in general.

In the preferred embodiment, curve, surface and solid generation facilities are provided for representing curved lines, surfaces, and solids drawn in three-dimensional space. The following section hereof describes the mathematical basis for the three-dimensional curve and surface facilities of the system of the present invention.

For purposes of illustration and not of limitation, the CAD/CAM computer system and work station of the present invention, can be realized (i.e., implemented) using the CAMAND 3000 Series ™ CAD/CAM System by Camax Systems, Inc. of Minneapolis, Minn. The CAMAND ™ 3000 Series CAD/CAM Computer System can include the 3030 Iris Series super workstation from Silicon Graphics of Mountain View, Calif., providing state-of-the-art capabilities for high level CAD/CAM usage. This three-dimensional engineering/designing workstation can provide the user with a rapid response time with real-time color graphics display, shading capabilities, multi-windowing, and multi-tasking capabilities.

The CAMAX CAD/CAM System includes CAMAND ™ Software that provides sufficient CAD/CAM capabilities for the design and manufacturing of computer-produced carved signs having surface features characteristic of traditional gold-leafed hand carved wood signs. CAMAND ™ Software includes comprehensive features which are suitable for three-dimensional graphic (or geometric) modeling, design analysis, documentation, and multi-axis numerical control programming of carved signage works to which the present invention is directed.

As an alternative to CAMAND 3000 Series ™ System from CAMAX Systems, Inc., the CAD system of the CPCS System hereof can be realized (i.e., implemented) using the ANVIL ™-5000 CADD/CAM Software System including the OMNISOLID ™ Solid Modeling Software System of Manufacturing and Consulting Services, Inc. (hereinafter MCS) of Irvine, Calif. The MCS ANVIL ™-5000 CADD/CAM System is a fully integrated 3-D CADD/CAM software package which provides wireframe, surface and solid modeling, finite-element mesh generation, analysis, drafting, and numerical control using the same integrated database structure and the same interactive interfaces.

MCS's OMNISOLIDS ™ Solids Modelling Software module is a Constructive Solid Geometry (CSG)/Boundary-Representation (B-REP) hybrid system which allows full use of all sculptured surfaces. The data structure of OMNISOLIDS ™ Solid Modelling Software Module is a GSG/B-REP hybrid. CSG is a method of storing a solid as a series of unions, intersections and differences of simpler solids, or primatives. B-REP, Boundary Representation, is a method of storing the faces (i.e., surfaces) of the solids. The OMNISOLIDS ™ Solid Modelling Software Module utilizes a combination of these two storage techniques.

The mathematical basis for three-dimensional curve facility of the preferred embodiment hereof, is now given with : respect to the Iris ™ curve facility of the CAMAND 3000 Series ™ CAD/CAM Computer System.

A curve segment is drawn by specifying a set of four "control points", and a "basis" function which defines how the control points will be used to determine the shape of the curve segment. Complex curved lines in three-dimensions representive of carving tool paths (e.g., character "center lines"), and the like, can be created by joining several curve segments end-to-end. The curve facility provides the means for making smooth joints between the curve segments.

For purposes of the present disclosure, the term "center line" will be hereinafter used much in the way that it is conventionally referred to in Fine Woodworking's *On Carving and How to Carve Wood*, both works published by Taunton Press.

The mathematical basis for the curve facility of the preferred embodiment, can be the parametric cubic curve. The curves in the present application which correspond to the three-dimensional "centerline" trough (of carved grooves in the signboard), are often too complex to be represented by a single curve segment and instead must be represented by a series of curve segments joined end-to-end. In order to create smooth joints, it is necessary to control the positions and curvatures at the end points of curve segments to be joined. Parametric cubic curves are the lowest-order representation of curve segments that can provide continuity of position, slope, and curvature at the point where two curve segments meet.

A parametric cubic curve has the property that x, y, z can be defined as third-order polynomials for some variable t:

$$x(t) = a_x t^3 + b_x t^2 + c_x t + d_x$$

$$y(t) = a_y t^3 + b_y t^2 + c_y t + d_y$$

$$z(t) = a_z t^3 + b_z t^2 + c_z t + d_z$$

A cubic curve segment is defined over a range of values for t (usually $0 \leq t \leq 1$), and can be expressed as a vector product.

$$C(t) = at^2 + bt^2 + ct + d$$

$$c(t) = [t^3 \ t^2 \ t \ 1] \begin{bmatrix} a \\ b \\ c \\ d \end{bmatrix}$$

$$c(t) = TM$$

The curve facility hereof can approximate the shape of a curve segment with a series of line segments. The end points for all the line segments can be computed by evaluating the vector product c(t) for a series of t values between 0 and 1. The shape of the curve segment is determined by the coefficients of the vector product, which are stored in column vector. These coefficients can be expressed as a function of a set of four control points. Thus, the vector product becomes $$c(t) = TM = T(BG)$$

where G is a set of four control points, or the "geometry", and B is a matrix called the "basis". The basis matrix B is determined from a set of constraints that express how the shape of the curve segment relates to the control points. For example, one constraint might be that one end point of the curve segment, is located at the first control point. Another constraint could be that the tangent vector at that end point lies on the line segment formed by the first two control points. When the vector product C is solved for a particular set of constraints, the coefficients of the vector product are identified as a function of four variables (the control points). Then, given four control point values, the vector product C(t) can be used to generate the points on the curve segment. For a detailed discussion of the various classes of cubic curves, including Cardinal Spline, B-Spline and Bezier Spline curve representations, reference can be made to the publication "Parametric Curves, Surfaces, and Volumes in Computer Graphics and Computer-Aided Geometric Design" (November, 1981) by James H. Clark, Technical Report No. 221 Computer Systems Laboratory, Stanford University, Standford, Calif.

Attention is now accorded to the mathematical basis for the surface facility of the present invention, which in the preferred embodiment, can be the Iris™ surface facility Three-dimensional surfaces, or patches, are presented by a "wire frame" of curve segments. A patch is drawn by specifying a set of sixteen control points, the number of curve segments to be drawn in each direction of the patch (i.e., precision), and the two "bases" which define how the control points determine the shape of the patch. Complex surfaces can be created by joining several patches into one large patch using the surface facility the method for drawing three-dimensional surfaces is similar to that of drawing curves. A "surface patch" appears on the viewing screen as a "wire frame" of curve segments. The shape of the patch is determined by a set of user-defined control points. A complex surface consisting of several joined patches, can be created by using overlapping sets of control points and B-spline and Cardinal spline curve bases.

The mathematical basis for the surface facility of the present invention, can be the parametric bicubic surface. Bicubic surfaces can provide continuity of position, slope, and curvature at the points where two patches meet. The points on a bicubic surface are defined by parametric equations for x, y, and z. The parametric equation for x is:

$$x(st) = a_{11} s^3 t^3 + a_{12} s^3 t^2 + a_{13} s^3 t + a_{14} s^3 + a_{21} s^2 t^3 + a_{22} s^2 t^2 + a_{23} s^2 t + a_{24} s^2 + a_{31} st^3 + a_{32} st^2 + a_{33} st + a_{34} s + a_{41} t^3 + a_{42} t^2 + a_{43} t + a_{44}$$

(the equations for y and z are similar). The points on a "bicubic patch" are defined by varying the parameters s and t from 0 to 1. If one parameter is held constant, and the other is varied from 0 and 1, the result is a cubic curve. Thus, a wire frame patch can be created by holding s constant several values, and using the facility hereof to draw curve segments in one direction, and doing the same for t in the other direction.

There are five steps in drawing a surface patch:

(1) The appropriate curve bases are defined. The Bezier basis provides "intuitive" control over the shape of the patch, whereas the Cardinal Spline and B-Spline bases allow smooth joints to be created between patches.

(2) A basis for each of the directions in the patch, u and v, must be specified. Notably, the u-basis and v-basis do not have to be the same.

(3) The number of curve segments to be drawn in each direction is specified, where a number of curve segments can be drawn in each direction.

(4) The "precisions" for the curve segments in each direction (i.e., u and v) must be specified. The precision is the minimum number of line segments approximating each curve segment and can be different for each direction. To guarantee that the u and v curves segments forming the wire frame, actually intersect, the actual number of line segments is selected to be a multiple of the number of curve segments being drawn in the opposing direction.

(5) Using appropriate "path" commands, as for example, of the Iris™ Graphics Library, the surface is actually drawn. The arguments to the "patch" command contain the sixteen control points that govern the shape of the patch, and associated with the x, y, and z of the sixteen control points, there is associated a 4×4 matrix, respectively.

Patches can be joined together to create the complex surfaces of three-dimensional signage works, by using for example, the Cardinal Spline or B-Spline bases, and overlapping sets of control points. In addition, curves and surfaces can be "blended", smoothed, filled and trimmed by mathematical processing.

For a discussion of the mathematical basis for the solid model facility of the preferred embodiment hereof, reference can be made to Chapter 3, Subchapter 4 entitled, "Parametric Volumes" of James H. Clark's Technical Report No. 221, Computer Systems Laboratory, Stamford University referred to hereinbefore.

Attention is now given to designing a signage work on the computer-aided design system hereof in accordance with the principals of the present invention. In realizing the design and manufacturing method of the present invention, one of several techniques can be used to design on the CAD system hereof, three-dimensional graphical models (e.g., three-dimensional geometrical representations and/or carving tool path data files) of a signage work to be carved in a signboard. In each embodiment of the method however, there exists a step of modeling in some form or another, the geometry of the components of a three-dimensional signage work, and determining an appropriate three-dimensional carving tool path provided by NC programming, to render the carved signage work in the signboard.

Figure 5:
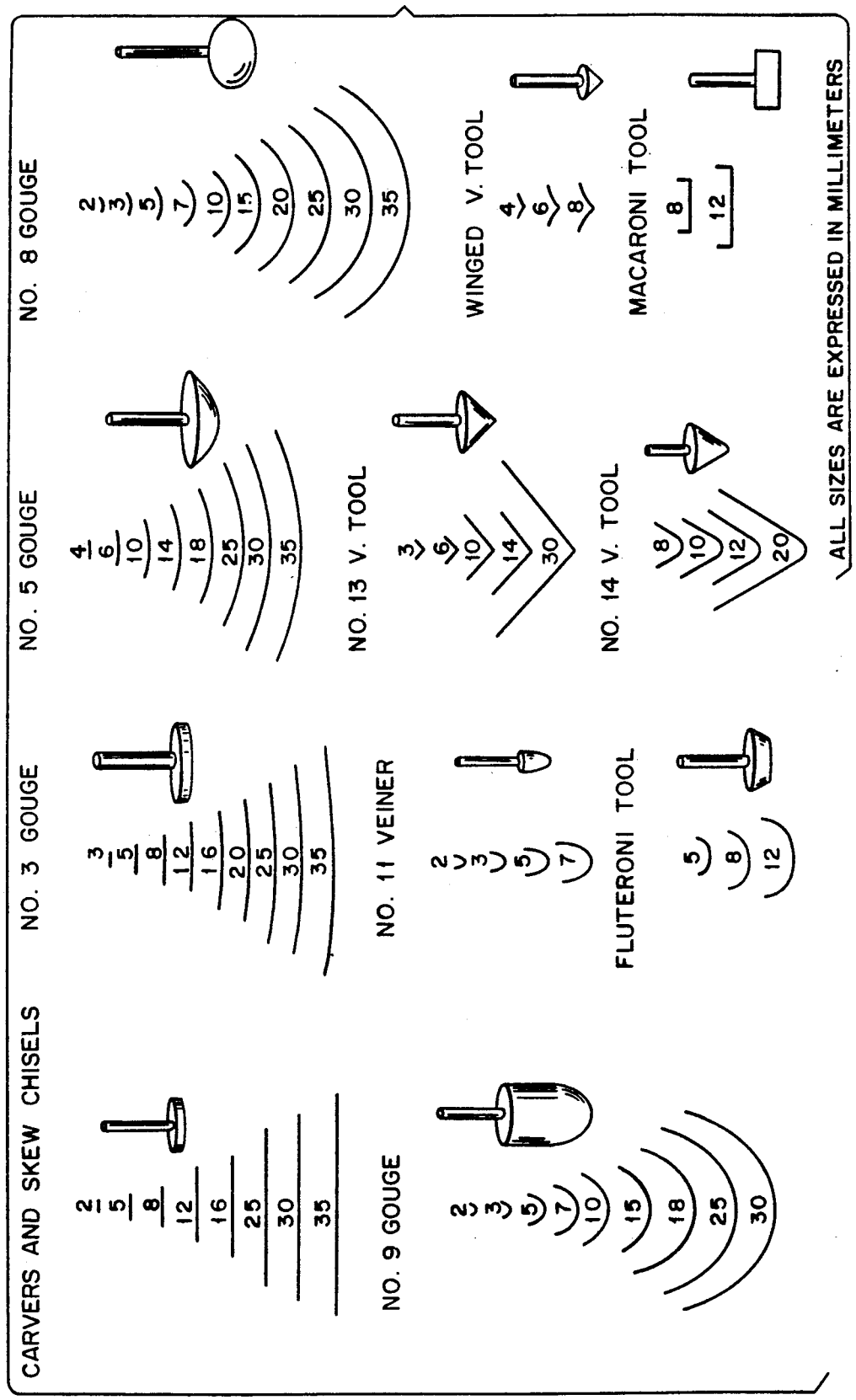
FIG. 5 is a chart showing several conventional sweeps of gouges and chisels positioned alongside corresponding tool bits for use with the axially rotating carving tool hereof, as to emulate conventional carving operations using method and apparatus of the present invention.

In developing the computer-assisted design and manufacturing method of the present invention, careful study has been accorded to the traditional tools of the wood carving signage craft. As illustrated in FIG. 5, such tools include wood carving chisels and gouges of various sweeps and sizes, and in particular, study has been given to the ways in which the various carving functions (i.e., involving traditional wood carving tools) can be emulated using, for example, the axially rotating carving tool 11 having a selected tool bit geometry, moved in three-dimensional space under the controlled guidance of the CAM system of the present invention.

Additionally, recognition is given to the fact that wood carvers have cut the sides of the grooves (i.e., gouges) of letters at angles ranging from 90° to 120° in order to form the "V" shaped grooves of many tradionally hand-carved incised letters. Notably, different wood carvers often select different angles to form the "V" as to reflect light in a preferred manner. In connection therewith, FIGS. 4C, 4D, 4E and 4K in particular, clearly illustrate how the width of a three-dimensional carved pattern (such as a groove) can be varied along a three- dimensional center line interposed between the inner and outer character outlines, by simultaneously controlling along the z axis, the cutting depth (e.g., z coordinates) of a cutter bit as it is moved along the three-dimensional carving tool path in the x-y plane of a three-dimensional coordinate system.

Hereinbelow is described one method in particular which has been developed for carving letters and other alphanumeric characters using the CPCS design and manufacturing system 1 and the carving tool bits illustrated in FIG. 5. This computer-assisted design method has been discovered to be a highly effective and most efficient method for designing three-dimensional computer graphic models and three-dimensional carving tool paths (including numerical coordinate data) for characters, to be used in producing three-dimensional carved patterns of three-dimensional signage works in sign boards, wherein the carved patterns have incised and/or relieved surfaces characteristic of traditional gold-leafed wood carved signs. This particular method will now be described below.

Figure 4A:
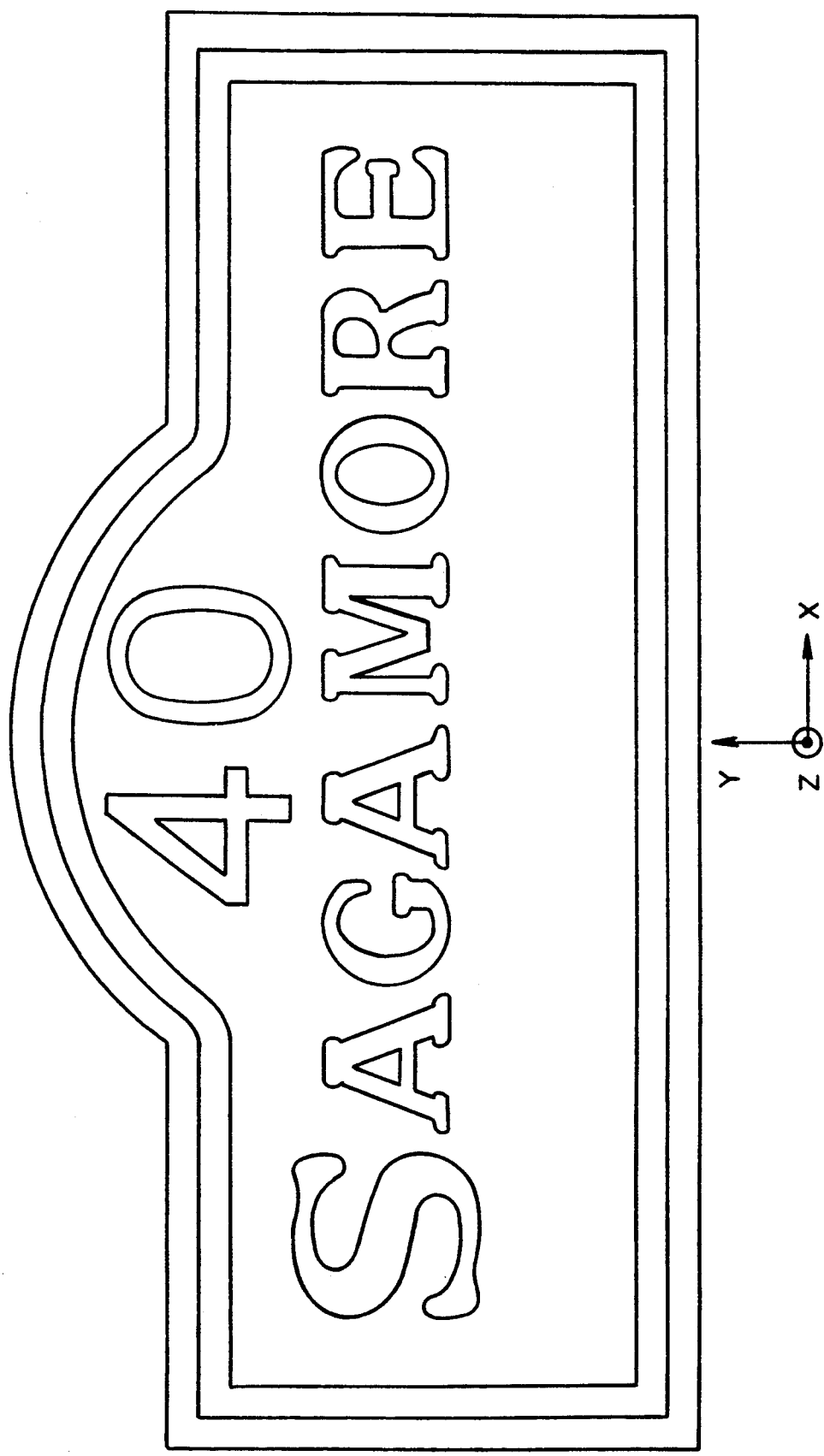
FIG. 4A is a plan view of a two-dimensional graphical model (i.e., representation) of a layout of an alphanumerical signage work displayed on the high-resolution color graphics display terminal of the computer-aided design system hereof.
Figure 4B:
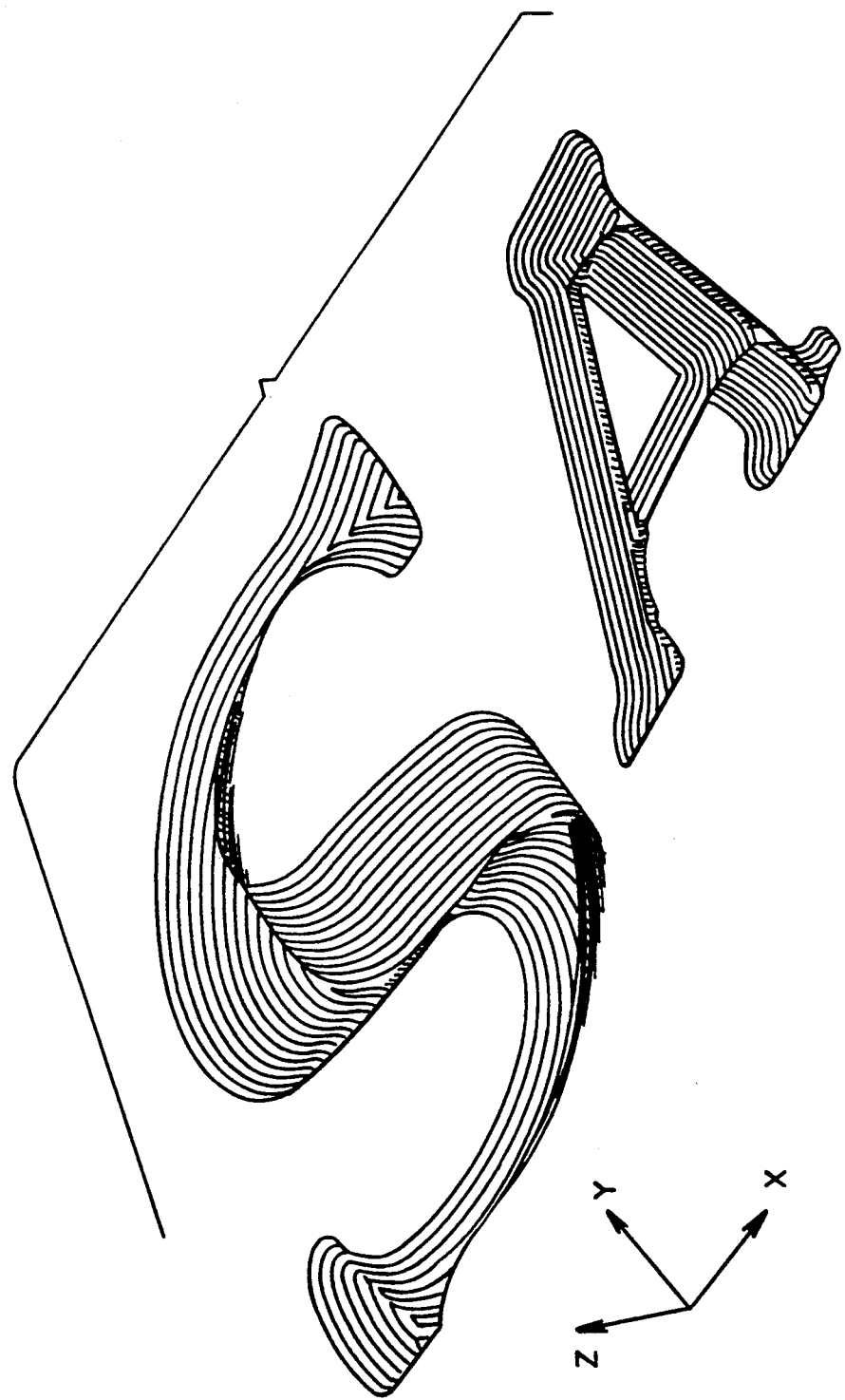
FIGS. 4B and 4C are different scaled perspective views of a three-dimensional graphical model of components of the signage work "SAGAMORE" shown in FIG. 3A, which are typically displayed on the color graphics display terminal during the process of generating three-dimensional graphical representations of alphanumerical characters from two-dimensional graphical representations (e.g., characteristic outlines) thereof, in accordance with the principles of the present invention.
Figure 4C:
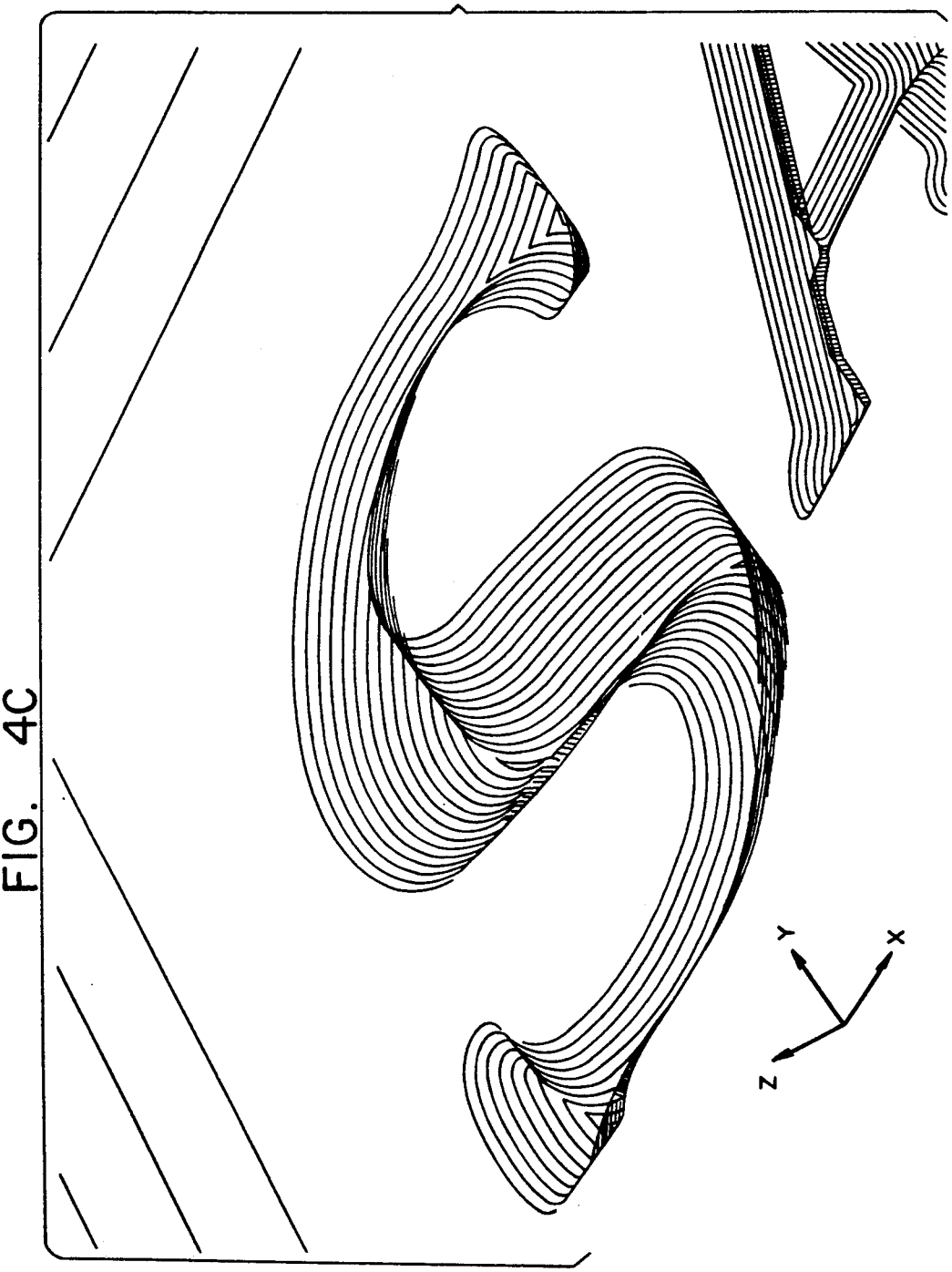
Figure 4E:
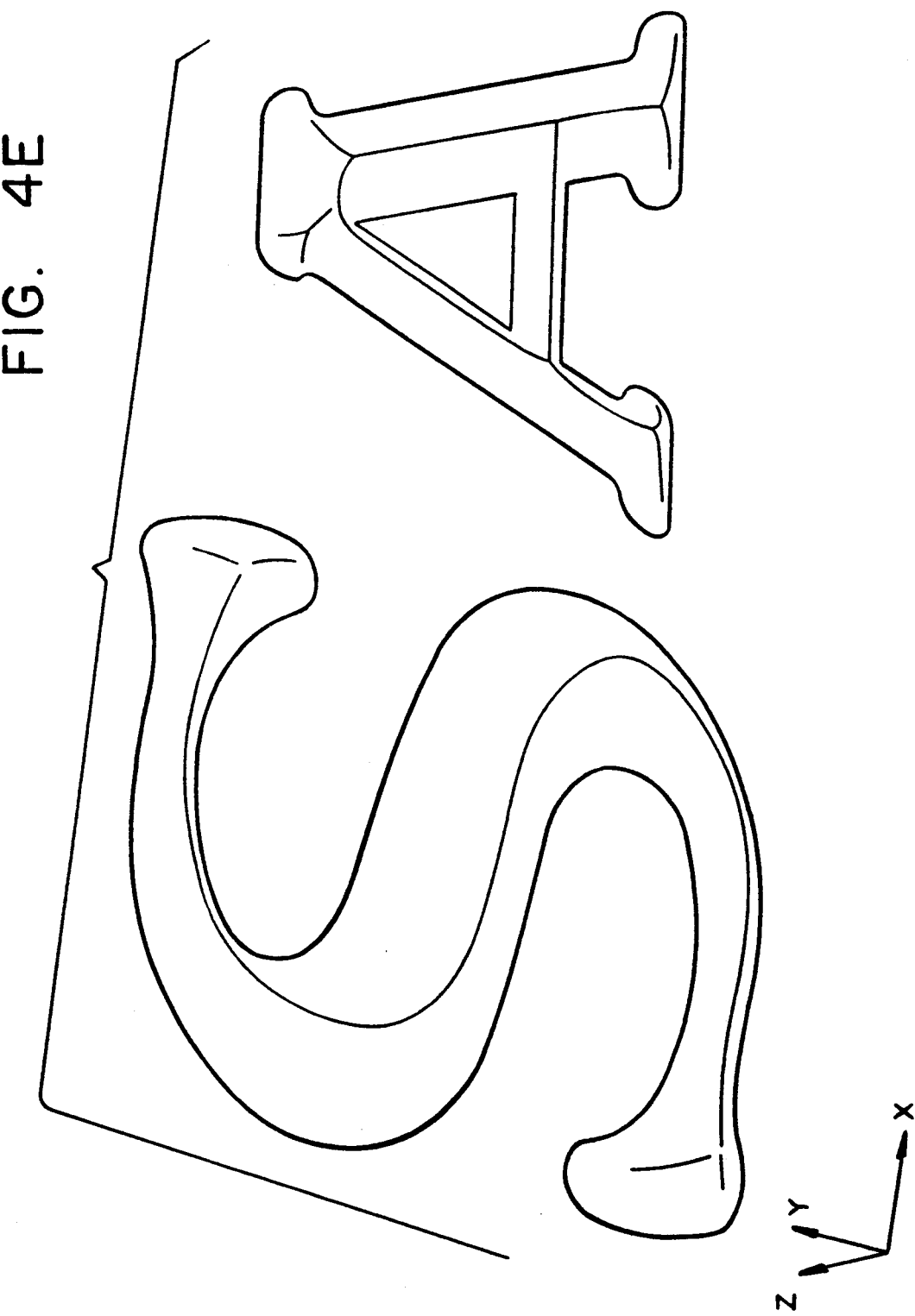

Referring to FIG. 4A, a two-dimensional computer graphic model (i.e., representation) of a layout of a three-dimensional signage work is presented in plan view as would appear on the display terminal 7. FIGS. 4B and 4C illustrate in greater detail two characters (i.e., components or parts) of a three-dimensional signage work whose geometry is being modelled on the CAD system. The three-dimensional graphical representations of the signage work of FIGS. 4B through 4J, preferably are displayed on the viewing screen 8 using high-resolution color graphics software.

Referring to FIGS. 4A and 4F through 4J, there is illustrated several principal steps comprising a method of generating three-dimensional graphical and numerical models of three-dimensional characters from traditional or novel two-dimensional characters or shapes, having "outer" (and sometimes "inner") characteristic outlines 18 and 19 respectively. The sequence of steps for this computer-aided design method will now be described in detail.

As indicated in FIG. 4A, a two-dimensional graphical representation (e.g., the "4" of "40 SAGAMORE") having "inner" and "outer" characteristic outlines 19 and 18, is displayed (i.e., plotted) in two-dimensions (e.g., the x-y plane) on the CAD system, such system preferably having high-resolution color graphics capabilities. As a matter of design choice, the characteristic outlines can be designated a particular color such as yellow.

As indicated in FIG. 4F, a plurality of substantially similar outlines 18A of the two-dimensional character (e.g., "4") are generated from the "outer" characteristic outline 18 and a plurality of substantially similar outlines 19A from the "inner" characteristic outline 19 thereof, at a predetermined offset (in millimeters) in a direction towards the inside (i.e., towards the centerline) of the two dimensional character. These "offsetted" characteristic outlines 18A and 19A can be designated as purple, for example.

As indicated from the characters of FIG. 4F, in particular, there can arise from this computer graphic design process, the formation of what will hereinafter be termed "islands", designated by 21A, 21B, and 21C of the character "4" in FIG. 4F. In accordance with the present invention, "island formations" can be thought of as the void or vacant two-dimensional spaces remaining within the space between the characteristic outer and inner outlines, 18 and 19 respectively, that is, after the outer and inner characteristic outlines 18 and 19 converge to within a distance apart equivalent to the offset distance. Notably, the character "0" of FIG. 4F has no island formations.

When island formations arise in the process of generating three-dimensional characters from two-dimensional characteristic outlines of characters, shapes, designs and the like, then either manual or programmed generation of "local" characteristic outlines, e.g., 22A, 22B and 22C, for the "islands" 21A, 21B and 21C respectively, must be generated. This procedure ensures that complete three-dimensional graphical models of signage works and components thereof can be provided. In such instances, the island characteristic outlines 22A, 22B and 22C can be offset to generate a plurality of island characteristic outlines as illustrated in FIG. 4F.

The plurality of "inner" and "outer" similar outlines (i.e., offsets) illustrated in FIG. 4F in particular, are then displayed on the CAD system's color graphics viewing screen, for review. The general appearance of these geometrically similar outlines are that of contour lines, of a contour map. But as will be illustrated in the description of this particular method, providing such similar outlines principally, although not solely, serve to help the designer determine on the CAD system (i) the depth (e.g., z coordinates) and (ii) the location (e.g., x, y coordinates) of the three-dimensional "center line" curve of the three-dimensional character produced from a transformed two-dimensional character, projected into the three-dimensional space.

Figure 4G:
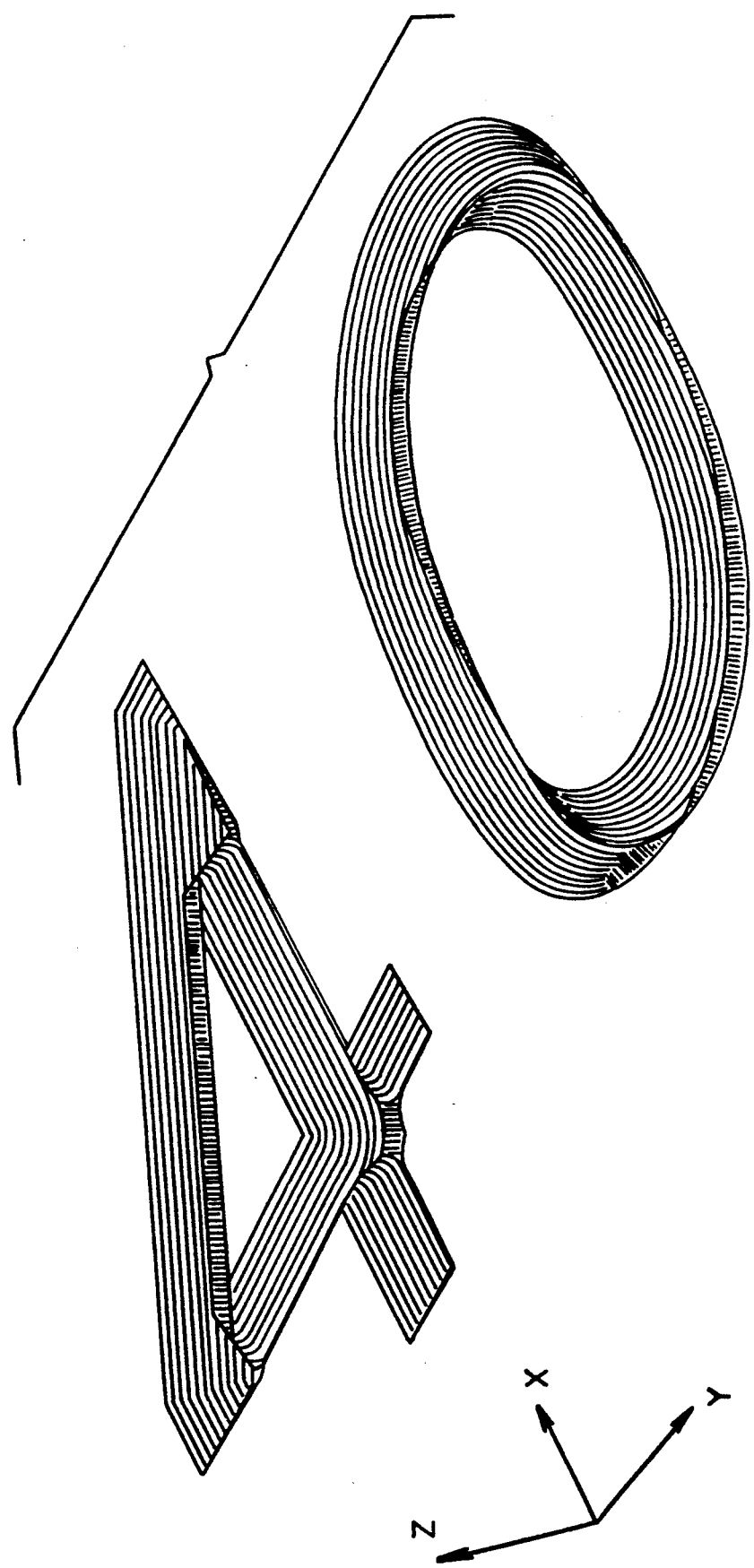
FIG. 4G is a perspective view of the three-dimensional graphical model of the numerical character "40" illustrated in FIG. 4F.
Figure 4H:
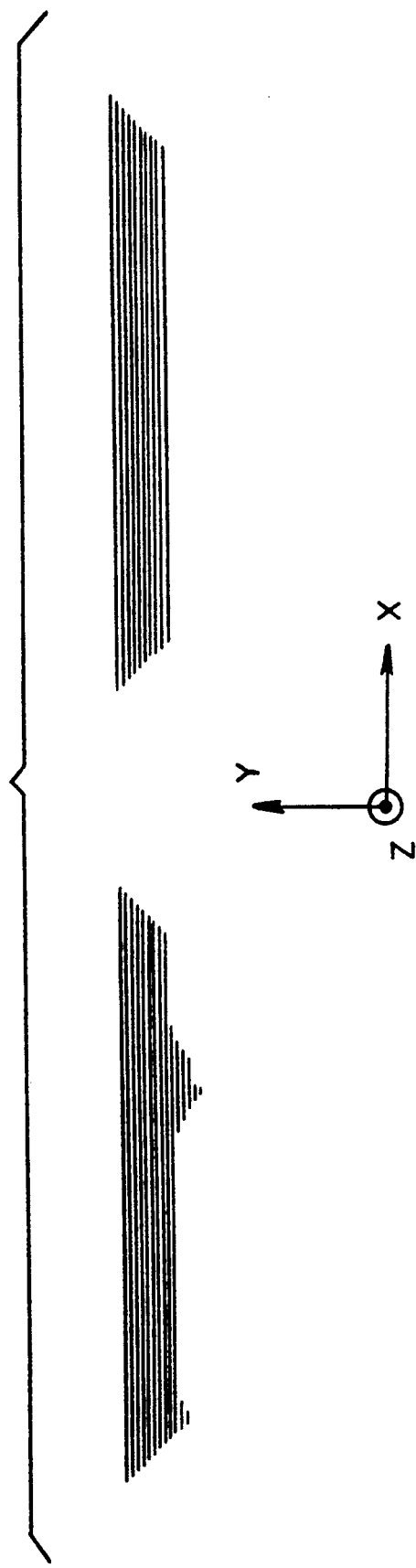
FIG. 4H is a side view of the three-dimensional graphical model of the numerical character illustrated in FIGS. 4F and 4G.
Figure 4I:
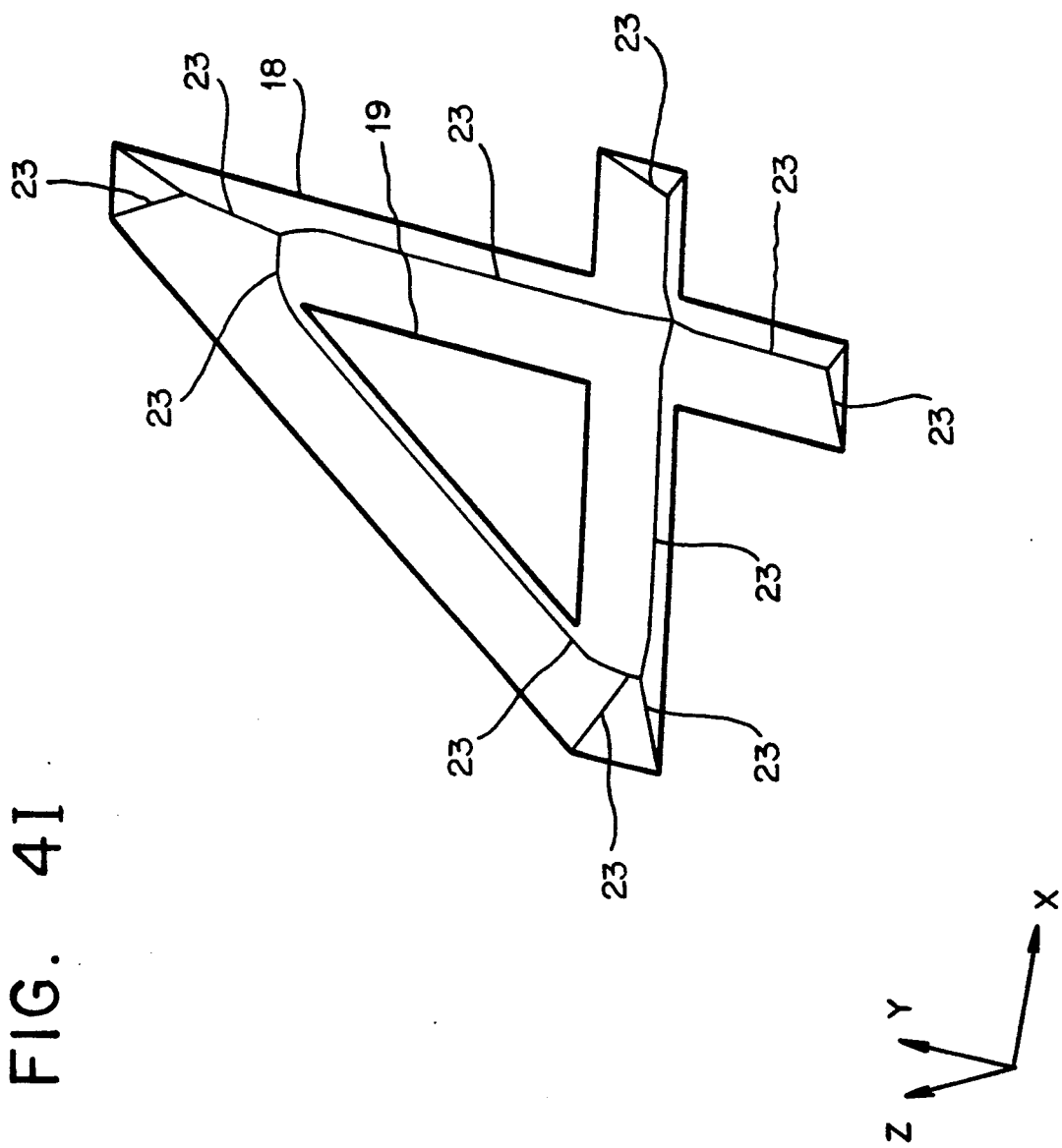
FIGS. 4I and 4J are different perspective views of three dimensional composite carving tool paths graphically shown in association with the characteristic outlines of the three-dimensional graphical models of the numerical character "4" illustrated in FIGS. 4F, 4G, and 4H hereof.
Figure 4J:
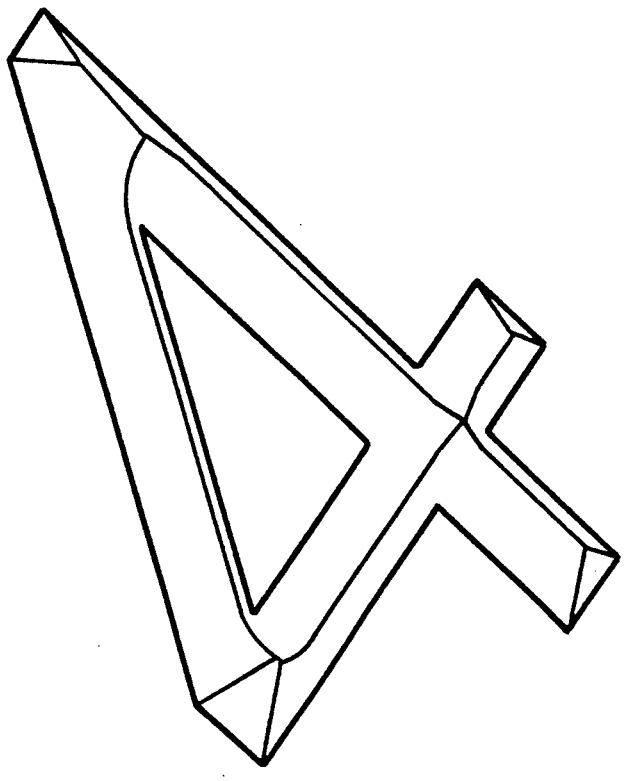
Figure 4J:
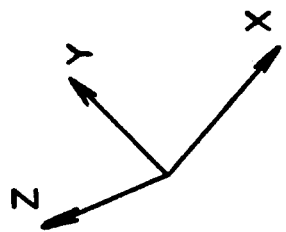
Figure 4K:
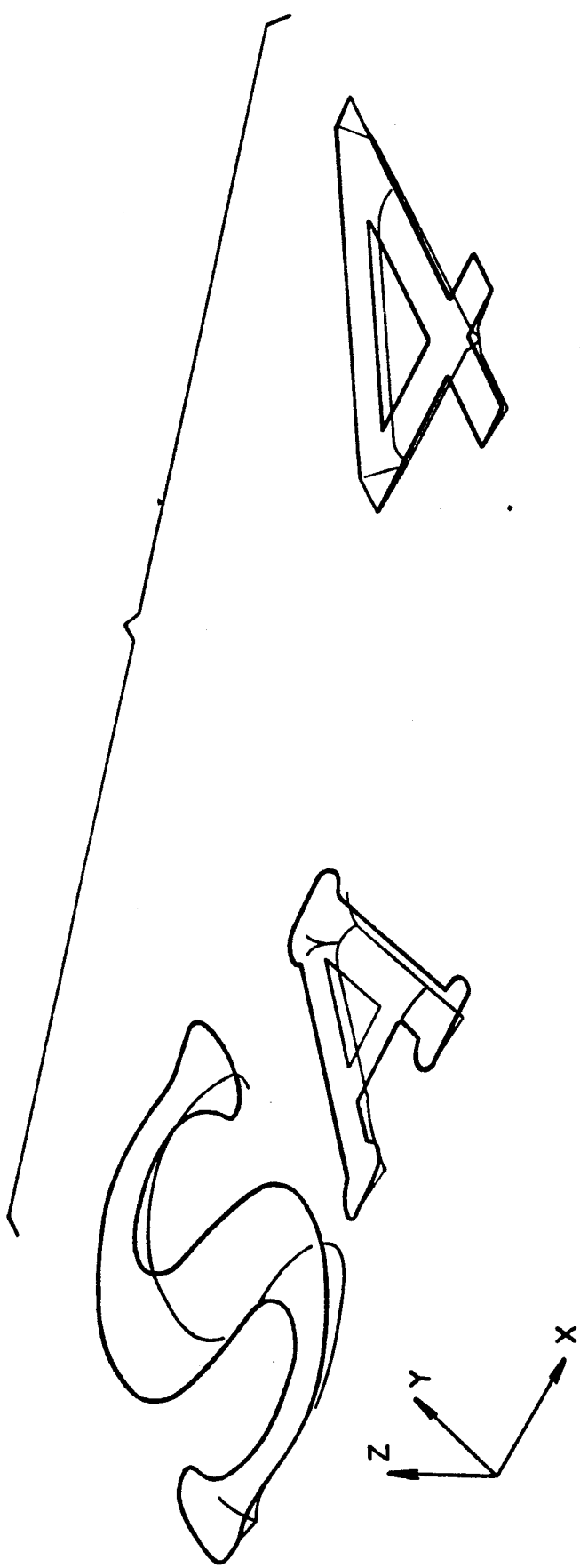
FIG. 4K is a perspective view of the three-dimensional composite carving tool paths graphically shown in association with respective characteristic outlines of three-dimensional graphical models of three alphanumeric characters "SA 4" illustrated in FIGS. 4A, through 4J hereof.

As illustrated in FIGS. 4G and 4H, each of the geometrically similar outlines are then translated (i.e., projected), a predetermined distance along the third dimension (e.g., z axis) of the CAD systems, three-dimensional coordinate system. As mentioned hereinabove, this step is helpful in assisting the designer to determine the location where the three-dimensional "center line" of the two-dimensional character will be drawn.

Thereafter, using the three-dimensional graphical model of FIG. 4G, a plurality of points are interactively introduced in the three-dimensional coordinate system, at locations corresponding to points lying along what can be visualized to be a three-dimensional tool path, along which the apex (i.e., tip) of an axially rotating cutting tool of predetermined cutting dimensions, moves under the guidance of the CAM system hereof. The interactive introduction of points can be achieved using a "stylus" or "mouse" device well known in the computer-aided design arts. These points are selected so that when the axially rotating cutting tool 11 is moved along the three-dimensional tool path, a desired three-dimensional carved pattern having desired three-dimensional surfaces of a visualized signage work, is formed in a signboard. Notably three-dimensional surfaces of the carved pattern will correspond to the three-dimensional surfaces of the three-dimensional graphical model (i.e., representation) of the three-dimensional alphanumerical character. As discussed in the curve mathematics section provided hereinbefore, the plurality of points are then appropriately interpolated using parametric spline-curve representations, to render the coordinates of a composite three-dimensional carving tool path 23 illustrated in FIGS. 4I and 4J. The carving tool path 23 when taken with a three-dimensional graphic model of a carving tool, corresponds to the three-dimensional carved pattern that is associated with the so designed three-dimensional graphical model of the three-dimensional character. Thereafter, the interactively introduced points can be erased for display purposes.

In connection with the above-described method of the present invention, a three-dimensional graphical model and corresponding numerical coordinate tool path data file(s) can be generated on the CAD system hereof, from a corresponding two-dimensional graphical model (e.g., characteristic outline) of the alphanumeric character. The alphanumerical character can be of any sort regardless of type style or font, and with or without serifs, a feature such as a fine cross-stroke at the top or bottom of a letter. The three-dimensional graphical representations, numerical coordinate carving tool paths, and other mathematical representations derived therefrom, once having been generated, can be stored in non-volatile memory (e.g., ROM) and can be used to create the data-base of the Graphics Library of the present invention, as discussed hereinbefore with reference to FIG. 2B.

The tool path data file so generated by the above-described design method, is then subject to post processing, an operation which involves processing the tool path data file to produce complete, machine-ready files, expressed in machine (i.e., assembly) or binary logical languages. In the post processor, the tool path data is matched (i.e., interfaced) to a particular CNC machine tool and machine control unit (MCU) combination. The output of the post processor can be generated for paper tape, magnetic memory storage or direct numerical control (DNC).

Notwithstanding post processing being a subject well known and understood in the art of NC programming, reference is made to a paper entitled "G-Posting To NC Flexibility", by the Computer Integrated Manufacturing Company, of Irving, Tex., and reprints from *Modern Machine Shop* of Cincinnati, Ohio. This paper provides a further discussion on the "generalized post-processor approach" utilized in simplifying NC workpiece programming and in making such programs function on different makes of similar types of machine tools.

In the preferred embodiment, the output of the post processor corresponds to a three-dimensional composite tool path data file, and three-dimensional graphical representations (i.e., models) of each alphanumerical character. The post processor output can also be used to create the extensive Graphics Library of numerous sets of three-dimensional alphanumerical characters of distinct typestyles (i.e., fonts). The computer-software based Graphics Library of the CAD/CAM sign carving system 1 of FIG. 2B, can provide a robust inventory of three-dimensional characters. The data files of these three-dimensional characters can be simply accessed by a designer at the work station 2, for purposes of designing a three-dimensional layout of a three-dimensional signage work. Once designed, the three-dimensional graphical model of the signage work can be displayed, reconfigured, and transformed to the designer's liking, and after generation of three-dimensional tool path data files and post processing thereof, provided to the CAM system 4 in order to carve the corresponding three-dimensional signage work into a signboard, by taking necessary and sufficient steps.

In addition to the above-described method of designing three-dimensional graphical models and tool path data files of three-dimensional alphanumerical characters derived from two-dimensional alphanumerical characters, an alternative method of achieving the same has been developed. This alternative method will now be described and explained below, after making a few preliminary remarks appropriate at this juncture.

As discussed hereinbefore, the methods thus described include that prior to carving any form of three-dimensional signage work in a signboard, the geometry of the design of the signage work is first specified by a computer graphic model from which thereafter a numerical coordinate (three-dimensional tool path) model is produced. In the present invention, the computer graphic and numerical coordinate tool path models of a signage work are prepared using computer-aided design and manufacturing techniques, all of which are based upon computer graphics and computational geometry, the latter being a subject which is given treatment in "Computational Geometry for Design and Manufacturing (1980)" by I. D. Faux and M. J. Pratt, published by John Wiley and Sons.

Notably, in the field of geometric (to be contrasted with graphical) design, if the design of a three-dimensional signage work has complex surfaces, as can many wood carved signage works, then precise surface descriptions would need to be given for those complex surfaces, prior to the determination of tool paths and the output of the post processor. This therefore makes geometric modeling using geometric primitives, a potentially time consuming process in some cases, as the nature and precision of the surface description given to a signage work is a question of mathematical form. Mathematical form, on the other hand, is a matter regarding the type of mathematical functions used to describe complex three-dimensional curves, surfaces and solids of signage works, wherein the three-dimensional surfaces thereof are characteristic of traditional gold-leafed hand-carved wood signs, and which are to be machine-carved in a signboard in accordance with the present invention.

In contrast with geometric design, graphical design on the CAD/CAM system of the present invention, can employ three-dimensional coordinate measuring methods and aparatus, which usually does not require production of geometric descriptions (i.e., functions) and can produce numeric models of three-dimensional objects to be carved in a signboard in accordance with the principles of the present invention. The advantages of each type of model used in computer-aided sign carving according hereto, will hereinafter appear obvious to those with ordinary skill in the art to which the present invention pertains.

It is also within the contemplation of the present invention, that there can appear at times, the need to employ additional modeling techniques based on alternative mathematical structures and processes operationally supported within the CAD system of the CPCS design and manufacturing system hereof. It has been discovered that this is especially the case when desiring to produce carved signs embodying signage works having three-dimensional surfaces akin to those characteristic of traditional hand-crafted gold-leafed wood carved signs in particular, and having relieved and/or incised carvings of characters and designs, in general.

In particular, in IEEE Computer Graphics and Applications Journal of January 1984, a paper is presented entitled "Computer-Integrated Manufacturing of Surfaces Using Octree Encoding" by Yamaguchi et al. The paper presents an algorithm for automatically generating from an octree description, numerical coordinate tool paths containing the data that a numerical control milling machine requires to manufacture a part. The octree data structure, representing a three-dimensional object by hierarchically organized cubes of various sizes, facilitates the performance of boolean operations and tool and work piece "interference" checking, and provides an approximate representation of smooth surfaces to any required accuracy. Also, since the octree model has a very simple data structure, the automatic generation of various types of carving tool paths is possible. Accordingly, the use of octree data structures, operations, and algorithms can be used with the CPCS design and manufacturing system hereof, to design three-dimensional graphical models of signage works having three-dimensional incised and/or relieved surfaces.

When graphically modeling signage works having certain surface topologies, it has been discovered that other CAD methods can be advantageously employed in designing and manufacturing carved signs in accordance with the principals of the present invention.

Additionally, as discussed hereinbefore, the method of the present invention, can make use of parametric spline-curve, spline-surface, and spline-volume (i.e., solid) representations as mathematical structures for geometric modeling of the three-dimensional surfaces of a signage work. Examples of such spline-curve and surface representations are defined and described in the IEEE Computer Graphics and Applications Journal, in the following articles: "Parametric Spline Curves and Surfaces" by B. A. Barskey, February 1986; "Rational B-Splines for Curve and Surface Representation" by Wayne Tiller, September 1983; "Rectangular V-Splines" by G. M. Nielson, February 1986; "A Procedure For Generating Contour Line From B-Spline Surface" by S. G. Sutterfield and D. F. Rogers, April, 1985.

Herebelow, using one of several known or yet-to-be-discovered parametric spline curve or surface representations, an alternative method is presented for generating, on the CAD system, a three-dimensional graphical model (i.e., representation) of a two-dimensional shape having at least one characteristic outline. This method comprises displaying in two dimensions on the CAD system, the two-dimensional graphical representation of the characteristic outline of the shape. From this two-dimensional graphical representation, the surface within the "characteristic outline" thereof is subdivided into a plurality of "surfaces patches", each of which can be independently created and smoothly connected together using surface mathematics as hereinbefore described. A spline surface representation of a particular type, can be selected as a basis for patches of the three-dimensional curved surfaces of the three-dimensional graphical model (i.e., representation) generated from the two-dimensional character. Interactively, an array of control points can then be introduced in three-dimensional space, to control the desired shape of the parametric spline-surface representations so to design the "surface patches" comprising the three-dimensional graphical model generated from the two-dimensional shape or character. The array of control points for each surface patch, are then interpolated using a spline surface representation to thereby generate the individual surface patches comprising the three-dimensional graphical model. From the resulting three-dimensional graphical model, a corresponding tool path can be automatically or interactively (i.e., manually) generated.

In connection with the design and manufacturing method of producing carved signs in accordance with the present invention, there are two prior art computer-aided methods which can be used in the process of designing from two-dimensional alphanumerical characters, three-dimensional graphical models thereof.

U.S. Pat. No. 4,589,062 to Kishi et al. incorporated herein by reference, discloses a method of creating curved surfaces which can be used in the design step involving the formation of three-dimensional graphical models of components of three-dimensional signage works. In particular, the method of U.S. Pat. No. 4,589,062 is an "interactive" method, which involves defining on a first section curve (e.g., characteristic outline), a first correspondence point which corresponds to a second correspondence on a second section curve (e.g., center line), and then generating intermediate section curves in accordance with the first and second correspondence points. In essence, such method involves moving and transforming a first section curve of two given section curves, until the first second curve is superposed on a second section curve. The major advantage thereof is that curved surfaces featuring subtle changes can be generated with increased degrees of freedom and created with accuracy. According to the present invention, the method of U.S. Pat. No. 4,589,062 can be employed in the process of producing a three-dimensional graphical model (i.e., representation) of a signage work in general, and three-dimensional graphical model of a three-dimensional character generated from a two-dimensional character having at least one characteristic outline, in particular.

Another method which can be used in the design step of the method of the present invention, involves automatically creating three-dimensional sculptured surfaces from sectional profiles designated on design drawings only. FAPT DIE-II Software from General Numeric of Elk Grove Village, Ill., provides such facility. For sectional profiles, curves on an optional plane in a space are classified into basic curves and drive curves. For example, assume that one basic curve and two (i.e., first and second) drive curves are designated on a design drawing. Sculptured surfaces are created by gradually changing the profile of the first drive curve to the second drive curve when the first drive curve moves toward the second drive curve along the basic curve. As applied to the present invention, the first and second drive curves can represent the effective cross-sections of an axially rotating carving tool disposed at two different points along the z axis herein. The basic curve can represent the center line of a carved groove in a signboard.

While the above methods of generating three-dimensional graphical models of characters may satisfy most designers of computer-produced carved signs, especially those designing signage works limited to lettering, the present invention understands that there are, nevertheless, CAD designers who desire to feature in their three-dimensional signage works, shapes and designs other than alphanumerical characters such as those commonly seen in hand-crafted "chip" carvings. In such situations, the designer will need to generate on the CAD system, three-dimensional graphical models having complex three dimensional surfaces. In such an event, the designers will require certain computer-assisted geometric modeling and NC tool path generation capabilities. This is to ensure that complex signage work components can be efficiently and effectively designed, composite tool path graphics displayed, and composite tool path numerical data generated therefrom and proven by computer simulation on the CAD system or by carving signboards with the CAM system of the present invention.

In accordance with the principles of the present invention, the components of a complex signage work can be modelled with any combination of "wire frame" and surface (or solid) primitives, including spline curve and surface representations. From the Graphics Library 17 in the system diagram of FIG. 2B, a designated computer program can access previously recorded two and three-dimensional graphical designs for creation of tool paths which can be dynamically displayed and interactively joined, and edited. This provides a visual representation of the exact tool paths relating to the graphically designed part. The NC tool path data can be in one of several formats, and an appropriate post processor will produce either paper tape, or magnetic recordings, or direct output for controlling the axially rotating carving tool 11 hereof preferably having five programmable axes of simultaneous movement as described hereinbefore.

The present invention also contemplates that there are instances when a designer will desire additional freedom in designing a three-dimensional graphical model of a signage work, that is, as compared with the above-described computer-aided design methods. It has been discovered that in such instances, it may even be desired to have the capability of representing three-dimensionally on the CAD system hereof, the removal of "solid" signboard constituting material, as does a carver skillfully utilizing conventional tools of the trade, such as chisels, gouges and hammers. In connection with such design capability, an alternative computer-aided design method has been developed and will be described hereinbelow.

This alternative computer-assisted design and NC programming method teaches "mathematically" subtracting (using Boolean operations), solid "stock material" (i.e., signboard material) representations from a signboard represented in the three-dimensional CAD system, which uses a computer-aided carving tool. Therein, the carving tool(s) is (are) represented on the CAD system in the form of a "solid" three-dimensional graphical structure representing the "effective" solid geometry of a specified tool bit in operation. The carving tool is also displayed on the visual display unit of the CAD system, and can be moved on the screen using a joystick, light pen or other conventional device. Between the three-dimensional images of the solid signboard and carving tool bit, a computational-based "three-dimensional image subtraction" process comprising "Boolean operations", is performed to generate a three-dimensional graphical representation of a signage work. Therefrom, tool path data associated with a particular three-dimensional, graphically represented carving tool, is automatically generated. The steps of the process are described below.

Using solid geometry, the designer models (i.e., represents) on the CAD system, the carving tool as well as the signboard and then removes (i.e., mathematically subtracts) the from the solid model of the signboard, the graphically represented stock material of the solid signboard model, over which the solid models (i.e., numeric and graphics-based three-dimensional graphical representations) of the carving tool bit and signboard, overlap. As the three-dimensional carved patterns are being defined, both the tool path graphics data and the tool itself can be displayed. At the same time or thereafter, tool path numerical data files thereof can be automatically generated using known computational processes.

The process described hereinabove involves three-dimensional solid-image subtraction and has the advantage of automatic tool path generation. Thus, this method of designing three-dimensional models of a signage work requires implementation of a three-dimensional image subtraction technique realized by a computer-aided process on the CAD/CAM computer 3. The computer-aided process effectuates the removal of three-dimensionally represented "solid" stock material in "union" (i.e., overlapping in 3-D space) with the position of the solid geometrical model of a carving tool (e.g. axially rotating carving tool bit). With this process, the removal of solid stock material in "union" with the solid carving tool model is achieved by mathematical subtraction (i.e., difference calculations) from a solid geometrical model of the signboard and in a manner which is analogous in some respects to the modus operandi of sign carvers employing manual, time-honored carving tools and procedures.

In realizing the above-described method, an enhanced version of one of the CAMAX CAMAND ™ and the MCS ANVIL-5000 OMNISOLIDS ™ solid (i.e., volume) modeling computer software program packages can be used to impliment the hereinabove described design process of the present invention. With such a process, a means is provided for mathematically or "computer graphically" carving signage works and automatically generating numerical coordinate tool path data therefor on the CAD/CAM system hereof. In implementing the above-described three-dimensional solid-image subtraction/ automatic tool path generation process, advantages can be derived by using work station software from Weber Systems Inc. of Brookfield, Wis. In particular, the work station software can allow an operator/designer practicing the present invention, to simultaneously view four different views of the Boolean-based computational process involving solid models of the carving tool and stock material (e.g., signboard).

In connection with the CAD method hereinbefore described, focus is now given to FIG. 5 wherein examples of carving tool bits of various geometries are illustrated, and which can be used with the design and manufacturing method of the present invention. Therein, the chart shows several conventional sweeps and gouges and chisels positioned alongside corresponding tool bits for use with axially rotating carving tool 11, which are capable of emulating conventional hand carving operations in accordance with the principles of the present invention. Also, as illustrated in FIG. 2, three-dimensional solid graphical (and numerical) models of the various carving tool bits illustrated in FIG. 5 can be stored in memory 24, and called up when desired by a designer or program.

The present invention also contemplates that there are instances when a designer will desire to design (i.e., define) a geometric model of a signage work using at least one or more of the parametric curve, surface, and solid generation facilities of the system hereof, and allow the CAD/CAM computer 3 to automatically generate the tool path parameters (e.g., carving tool specifications, numerical coordinate tool path data, spindle and feed speeds, etc.), tool entry methods, and clearance planes, in a language compatible with the post-processor available.

There will also be times when a computer-assisted designer may desire to carve a three-dimensional pattern or design of a preexisting "physical" object, alongside or around carved lettering comprising in combination therewith, a composite signage work. Realizing that creating a graphical (or geometrical) model of preexisting physical objects requires substantial time at the work station 2, a three-dimensional graphical and numerical model of such signage work can be designed (i.e., provided) by recording the coordinates of the three-dimensional surfaces of the physical object to be carved in the signboard, as to produce a three-dimensional graphical and numerical model of such signage work or component thereof. Using automatic or manual tool path generation techniques and one of several carving tools, a numerical coordinate data file of a composite tool path therefor can be produced.

This CAD technique offers the advantage of obviating the need to manually generate a three-dimensional graphical model of the physical object using computational geometry and the like, but rather utilizes three-dimensional surface coordinate measuring methodologies, based in part on principals of holographic imaging and optical memory storage. In such instances, "three-dimensional coordinate measuring" methods and apparatus can be used in the step of designing (i.e., producing or providing) a three-dimensional graphical model of a signage work, in accordance with the design and manufacturing method of the present invention. In particular, a laser-based non-contact height profiling system can be employed to carry out methods of measuring three-dimensional coordinates of the surfaces of a low profiled physical object (i.e., digitizing three-dimensional objects) to be carved in a signboard. An example of such three-dimensional coordinate measuring apparatus 25 diagrammatically illustrated in FIG. 2, is the Cyberscan ™ profiling system available from Cyberoptics Inc., of Minneapolis, Minn. and as the corporate name suggests, optical principles can be applied to achieve control processes. In the case of the present invention, the control processes would be the CAM system 4 guiding the carving tool 11 in accordance with carving tool paths generated from a three-dimensional graphical model of the preexisting physical object.

Another approach using three-dimensional coordinate measuring methods and apparatus can involve utilization of holographic recording methods and equipment. In such instances, a three-dimensional graphical model can be produced by holographically recording a physical object to be carved in a signboard, using holographic equipment. The holographically recorded image of the physical object can be stored and digitally processed to provide in a suitable computer graphic format, a three-dimensional graphical model of the physical object. From this three-dimensional graphical model, suitable carving tool paths (i.e., numerical data files) can be generated using either manual, semi-manual or automatic tool path generation techniques.

Alternatively, a hand-held stylus called the "3 Space Digitizer" from Polhemus Navigation Sciences, of Colchester, Vt., can be used to enter x, y, and z coordinate data of three-dimensional physical objects or models, into a properly interfaced CAD/CAM system. Using a Unigraphics ™ CAD/CAM workstation from The McDonnel Douglas Corporation, an alphanumeric terminal initiates the digitizer task, and the 3 Space Digitizer can be used to enter complex geometry of nonmetallic objects (e.g., to determine the x, y, and z coordinates of points located on a 3D model or object). The 3D Space Digitizer transmits this data to a host computer which includes a C.P.U., tape drive, and disk drive, and stores data in user-specified part files and interfaces with the Unigraphics ™ workstation.

The 3D Space Digitizer can be used to measure the coordinates (i.e., digitize the space dimensions) of three-dimensional physical objects that are to be made part of signage works, employing one or more of incised, relieved, or applique modes of carving. From so produced numerical models of these objects, a three-dimensional graphical model thereof can be displayed, and numerical coordinate tool path data files generated.

Two-dimensional recording of surface coordinates of preexisting physical objects can also be performed using 2-D coordinate measuring methods and apparatus to provide two-dimensional characteristic outlines thereof. Thereafter, characteristic outlines so produced, can be used to generate therefrom, three-dimensional graphical models in accordance with the methods described hereinbefore.

OPERATION OF PREFERRED EMBODIMENT HEREOF

It is appropriate at this juncture having described hereinbefore methods and apparatus of the present invention, to now describe the operation of the preferred embodiment of the CAD/CAM design and manufacturing system 1 of the present invention during an explemary design and manufacturing cycle based on the principles thereof.

Visualizing in ones mind a signage work to be carved on a signboard, a designer using the design and manufacturing method hereof, has great flexibility and numerous design tools from which to choose. More specifically, an operator using the CPCS CAD/CAM system hereof has several options in producing a three-dimensional graphical model of a signage work to be carved in a signboard.

One method of designing a three-dimensional graphical model of a signage work is to apply at the workstation 2, one of the various computer-aided design methods described hereinbefore. For example, using on the CAD system hereof, the method of generating three-dimensional alphanumerical characters from corresponding two-dimensional alphanumerical characters can produce a three-dimensional graphical (and numerical model) model of a composite signage work comprising such characters.

Alternatively, three-dimensional coordinate measuring methods and apparatus can be used through the workstation 2, to provide a three-dimensional graphical model of a physical object to be used as a signage work which is intended to be carved in a signboard according to principles of the present invention.

Yet, on the other hand, a designer using one of the computer-aided design methods described hereinbefore can visualize a signage work and applying such design methods, produce a three-dimensional graphical model of the signage work.

From the three-dimensional graphical model however produced, a mathematical representation of the signage work, such as a numerical coordinate (tool path) data file, can be generated and provided to the CAM system 4 having carving tool 11. The material constituting the signboard is then removed using the carving tool 11 moving under the controlled guidance of the CAM system 4, to leave in the signboard, a three-dimensional carved pattern corresponding to the signage work. Notably, the three-dimensional carved pattern in the signboard will have three-dimensional surfaces corresponding to the three-dimensional surfaces of the three-dimensional graphical model of the signage work.

It is herein noted that during the machine carving operation, tool change may be required according to the designed carving program (e.g., tool path data file) which has been provided to the Post Processor 16 of the CAM system 4. In such instances, carving tool bits of the type illustrated in FIG. 5, can be accessed from tool storage 26 during a carving operation, and changed in accordance with the carving program whereafter the carving operation can resume. Tool change can occur as often as desired.

Also in instances where "chisel or gouge markings" formed in the three-dimensional carved grooves are desired, an approach employing several levels of carving processes (and thus multiple composite carving tool paths) can be adopted and CNC programmed. In such a multi-stage carving process, the later stages of the carving process can include carving tool movement to create the chisel and/or gouge markings, as to emulate the textural appearance of such traditional hand-carved wood signs.

After a signage work has been carved into the signboard using the computer-aided design and manufacturing method of the present invention, finishing operations can then be performed on the carved sign according to conventional principles and techniques.

For example, the carved signboard can be prepared for painting and gold leafing. In cases where the signboard is constituted of wood, conventional wood finishing techniques can be employed. Examples of such techniques can be found in *How to Carve Wood* by Richard Butz cited hereinbefore. Thereafter, gold-leaf material can be applied to the signboard in accordance with techniques known in the traditional wood carving arts. Discussion of such applicable techniques can be found in Chapter IX entitled "Laying and Burnishing Gold" of *Writing & Illuminating & Lettering* (1983) by Edward Johnston, published by Adam & Charles Black of London, England, and by the Taplinger Publishing Co., Inc. of New York, N.Y. In the case where vinyl or like plastic is used as signboard constituting material, conventional gold-leafing can be obviated, and chrome or gold spray or deposition processes can be used. Alternatively where the signboard is constituted of metal, electroplating processes can be used to deposit light reflective coatings over three-dimensional carved surfaces.

Attention is now accorded to the types of materials out of which the signboards may be constituted. It has been discovered that aside from woods such as for example, mahogany, pine, redwood and cedar, other materials such as acrylic, vinyl, polycarbonate, styrene, aluminum, brass and foam board, also provide suitable signboard materials for practicing the method of the present invention.

There are several parameters which should be considered prior to carving using the design and manufacturing method of the present invention. Specifically, as regards spindle speeds, (i.e., of the axially rotating carving tool 11), it has been discovered that speeds within the range of 15,000 to 24,000 RPM have provided excellent results when computer-carving mahogany wood. However, when using wood, cutting directions of the axially rotating carving tool hereof must also be considered in view of the grain of the wood. It has been discovered that information regarding "grain" of particular wood signboards to be carved using the methods hereof, can be model on the CAD system and used to generate tool paths which consider the grain of the wood signboard.

In the present invention sanding operations can be executed using axially rotating sanding tools of appropriately configured dimensions, which are moved in the three-dimensional carved grooves of signage works, under the guidance of the NC programmed CAM system hereof.

It would be within the scope and spirit of the present invention to also provide computer-produced sternboards for boats, yachts and the like, as well as computer-produced tombstones using the design and manufacturing method of the present invention. In the case of tombstones, the signboard can be a stone material such as granite, marble, sandstone or other suitable material, and the carving tool bit can be "diamond tipped" or made of material appropriate for carving stone under the guidance of the CAM system hereof.

Using the method and apparatus of the present invention, names and patterns typically cut into tombstones by conventional waterjet cutting, sandblasting, chiseling and routing processes can be carved by way of an axially rotating cutting tool having at least three-programmable axes of simultaneous movement, under the guidance of the CAM system hereof.

It would also be within the scope and spirit of the present invention to utilize one of laser and sandblasting principled devices as the carving tool of the method and apparatus of the present invention.

In the case where laser devices are used, a laser beam of sufficient energy to burn away wood or other signboard constituting material can be controllably moved simultaneously in at least three programmable axes under the controlled guidance of the CAM system hereof. Such controlled movement of laser beams can remove signboard constituting material as to leave three-dimensional carved patterns in the signboard, which correspond to the three-dimensional surfaces of the three-dimensional graphical model of the signage work to be carved therein. One example of laser cutting techniques is illustrated in U.S. Pat. No. 4,430,548 to Macken wherein laser apparatus and a process for cutting paper is disclosed.

In the case where sandblasting devices are used, a focused pressurized stream of sand or like particles to blast away wood or other signboard constituting material, can be controllably moved simultaneously in at least three programmable axes under the controlled guidance of the CAM system hereof.

However, in both the laser cutting and sandblasting processes described hereinabove, controlling the cutting depth of the laser beam in the case of the laser cutting process, and the sand stream in the case of the sandblasting process, is extremely difficult. In both cases, the post processor must take into consideration (i) the physical properties of the signboard material, and (ii) the precise energy (i.e., heat or momentum) of the cutting process utilized so that precise cutting depths can be obtained.

Further modifications of the present invention herein disclosed will occur to persons skilled in the art to which the present invention pertains and all such modifications are deemed to be within the scope and spirit of the present invention defined by the appended claims.

What is claimed is:

1. A method of forming a carved sign embodying a signage work having three-dimensional surfaces, comprising:
   (a) designing on a computer-aided design system, a three-dimensional graphical model of said signage work including an alphanumerical character having three-dimensional surfaces to be carved in a signboard, said three-dimensional graphical model comprising a three-dimensional graphical representation of said alphanumerical character having three-dimensional surfaces;
   (b) determining on said computer-aided design system, a desired mathematical representation of said three-dimensional graphical model of said signage work to be carved in said signboard;
   (c) providing said desired mathematical representation to a computer-aided machining system having a carving tool; and
   (d) removing constituting material of said signboard using said carving tool moving under the controlled guidance of said computer-aided machining system, to leave in said signboard, a three-dimensional carved pattern corresponding to said three-dimensional graphical model of said signage work, wherein said three-dimensional carved pattern in said signboard has three-dimensional surfaces corresponding to said three-dimensional surfaces of said three-dimensional graphical model of said signage work,
   wherein said three-dimensional graphical representation of said alphanumerical character is generated from a corresponding two-dimensional graphical representation having a characteristic outline by:
   (a) projecting in two dimensions on said computer-aided design system, said two-dimensional graphical representation of said character having a characteristic outline;
   (b) generating from said characteristic outline of said two-dimensional graphical representation of said character, at a predetermined offset towards the inside of said two-dimensional graphical representation of said character, a plurality of substantially similar outlines of said two-dimensional graphical representation and displaying said plurality of similar outlines on said computer-aided design system;
   (c) projecting each of said similar outlines a predetermined distance along the third dimension of the coordinate system of said computer-aided design system;
   (d) introducing in said three-dimensional coordinate system, a plurality of points at locations corresponding to points along a three-dimensional tool path of an axially rotating carving tool of predetermined carving dimensions which, when moved along said three-dimensional tool path, forms in said signboard a desired three-dimensional carved pattern having three-dimensional surfaces corresponding to said three-dimensional surfaces of said three-dimensional graphical surfaces of said alphanumerical character, and
   (e) interpolating said plurality of points to render the coordinates of said three-dimensional tool path.

2. The carved sign of claim 1 wherein said desired mathematical representation comprises a numerical coordinate data file corresponding to a three-dimensional carving tool path for carving said signage work.

3. The carved sign according to claim 1 wherein said method further comprises,
   applying a light reflective coating to said three-dimensional carved pattern.

4. The method according to claim 3, wherein said light reflective coating is one of gold leaf and gold paint.

5. The method according to claim 1 including the step of rotating said carving tool about an axis.

6. A method of carving a signboard, comprising:
   (a) displaying in two dimensions on a computer-aided design system, a two-dimensional graphical representation of a character having an outline;
   (b) generating from said outline of said two-dimensional character, at a predetermined offset towards the inside of said two dimensional character, a plurality of substantially similar outlines of said two-dimensional character and displaying said plurality of similar outlines on said computer-aided design system;
   (c) projecting each of said similar outlines a predetermined distance along a third dimension of a coordinate system of said computer-aided design system, thereby providing a three-dimensional graphical model of said character;
   (d) introducing in said three-dimensional coordinate system, a plurality of points at locations corresponding to points along a three-dimensional tool path of an axially rotatable carving tool of predetermined dimensions;
   (e) interpolating said plurality of points to render the coordinates of said three-dimensional tool path;
   (f) causing said rotatable carving tool to engage a signboard;
   (g) causing said rotatable carving tool to rotate about an axis, and
   (h) causing said rotatable carving tool to move along said three-dimensional tool path, thereby carving a three-dimensional v-shaped pattern within said signboard having a center line and smooth three-dimensional surfaces corresponding to the surfaces of said three-dimensional graphical model.

7. The method of claim 6 wherein said axially rotating carving tool provides a carving angle of about between 60° to 120° within said signboard.

8. A method of carving a signage work in a signboard, comprising:
(a) graphically representing a signboard using solid geometry to provide a solid graphical model thereof;
(b) graphically representing a carving tool using solid geometry to provide a solid graphical model thereof;
(c) moving said solid graphical model of said carving tool through said solid graphical model of said signboard;
(d) mathematically subtracting those parts of said solid graphical model of said signboard that are in mathematical union with said solid graphical model of said carving tool during said movement thereof in step (c), as to form a three-dimensional graphical model of a signage work in said solid graphical model of said signboard;
(e) displaying said three-dimensional graphical model of said signboard resulting from step (d);
(f) generating a three-dimensional carving tool path corresponding to the generation of said three-dimensional graphical model of said signage work using said solid graphical model of said carving tool;
(g) generating a three-dimensional numerical coordinate data file corresponding to said three-dimensional carving tool path;
(h) causing an axially rotatable carving tool to engage a signboard, and
(i) causing said rotatable carving tool to move along a path corresponding to said three-dimensional carving tool path while rotating said carving tool about an axis, thereby removing material from said signboard to provide a signage work corresponding to said three-dimensional graphical model, such that said signage work includes substantially v-shaped grooves having smooth, opposing side walls which adjoin each other along center lines within said grooves.

* * * * *